US010618213B2

(12) United States Patent
Childers et al.

(10) Patent No.: US 10,618,213 B2
(45) Date of Patent: *Apr. 14, 2020

(54) METHOD AND APPARATUS FOR CONTINUOUSLY FABRICATING A COMPOSITE SANDWICH STRUCTURE

(71) Applicant: The Boeing Company, Chicago, IL (US)

(72) Inventors: Christopher H. Childers, Saint Louis, MO (US); Cori A. Jackson, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/435,391

(22) Filed: Feb. 17, 2017

(65) Prior Publication Data

US 2018/0236734 A1 Aug. 23, 2018

(51) Int. Cl.
| B29C 51/08 | (2006.01) |
| B32B 27/20 | (2006.01) |
| B29B 13/08 | (2006.01) |
| B29B 13/02 | (2006.01) |
| B29C 70/50 | (2006.01) |
| B29C 51/00 | (2006.01) |
| B32B 37/14 | (2006.01) |

(Continued)

(52) U.S. Cl.
CPC ............ B29C 51/08 (2013.01); B29B 13/023 (2013.01); B29B 13/08 (2013.01); B29C 70/50 (2013.01); B29D 24/005 (2013.01); B29D 99/0021 (2013.01); B32B 27/20 (2013.01); B32B 37/146 (2013.01); B29C 51/00 (2013.01); B32B 2605/18 (2013.01)

(58) Field of Classification Search
CPC .......... B32B 37/06–065; B32B 37/146; B29C 70/50–528; B29C 51/00; B29C 51/08–087; B29C 51/14–145; B29C 51/18; B29C 51/42–428
USPC ..... 264/171.1, 172.19, 173.11; 156/196–227
See application file for complete search history.

(56) References Cited

U.S. PATENT DOCUMENTS

| 6,087,640 A | 7/2000 | Gillespie et al. |
| 6,528,771 B1 | 3/2003 | Matsen et al. |
| 6,979,807 B2 | 12/2005 | Anderson et al. |

(Continued)

OTHER PUBLICATIONS

Poly(ethylene terephthalate). Polymers: A Properties Database (ChemNetBase). Entry ID: 2855. CRC Press. 2018. (Year: 2018).*

*Primary Examiner* — Stephen E Rieth
(74) *Attorney, Agent, or Firm* — Walters & Wasylyna LLC

(57) ABSTRACT

A method for continuously fabricating a composite sandwich structure includes the steps of: (1) moving a laminate, substantially continuously, through a preheating zone, wherein the laminate includes a first face sheet, a second face sheet and a core sandwiched between the first face sheet and the second face sheet; (2) preheating the laminate to a preforming temperature above a glass transition temperature of the laminate and below or equal to a crystalline melt temperature of the laminate as the laminate is being moved through the preheating zone; (3) moving the laminate, substantially continuously, through a consolidation zone; and (4) consolidating the laminate as the laminate is being moved through the consolidation zone to form a continuous length of the composite sandwich structure.

19 Claims, 13 Drawing Sheets

(51) Int. Cl.
   *B29D 99/00*  (2010.01)
   *B29D 24/00*  (2006.01)

(56)           References Cited

U.S. PATENT DOCUMENTS

| | | | |
|---|---|---|---|
| 7,807,005 | B2 | 10/2010 | Rubin et al. |
| 7,871,553 | B2 | 1/2011 | Wilkerson et al. |
| 8,017,059 | B2 | 9/2011 | Matsen et al. |
| 8,268,226 | B2 | 9/2012 | Vander Wel et al. |
| 8,333,858 | B2 | 12/2012 | Rubin et al. |
| 8,343,402 | B1 | 1/2013 | Matsen et al. |
| 8,372,327 | B2 | 2/2013 | Matsen et al. |
| 8,375,758 | B1 | 2/2013 | Matsen et al. |
| 8,383,028 | B2 | 2/2013 | Lyons |
| 8,383,998 | B1 | 2/2013 | Matsen et al. |
| 8,425,708 | B2 | 4/2013 | Rubin et al. |
| 8,491,745 | B2 | 7/2013 | Wilkerson et al. |
| 8,529,809 | B2 | 9/2013 | Bartel et al. |
| 8,691,137 | B2 | 4/2014 | Prebil et al. |
| 8,963,058 | B2 | 2/2015 | Matsen et al. |
| 9,102,103 | B2 | 8/2015 | Fox et al. |
| 9,174,393 | B2 | 11/2015 | Bartel et al. |
| 9,222,006 | B2 | 12/2015 | Blohowiak et al. |
| 9,238,338 | B2 | 1/2016 | Wilkerson et al. |
| 9,248,613 | B2 | 2/2016 | Wilkerson et al. |
| 9,352,518 | B2 | 5/2016 | Prebil et al. |
| 9,358,764 | B2 | 6/2016 | Prebil et al. |
| 9,452,840 | B2 | 9/2016 | Lyons et al. |
| 9,498,915 | B2 | 11/2016 | Bartel et al. |
| 2005/0035115 | A1 | 2/2005 | Anderson et al. |
| 2007/0175571 | A1 | 8/2007 | Rubin et al. |
| 2007/0175572 | A1 | 8/2007 | Rubin et al. |
| 2007/0175573 | A1 | 8/2007 | Fox et al. |
| 2007/0175575 | A1 | 8/2007 | Rubin et al. |
| 2008/0185756 | A1 | 8/2008 | Wilkerson et al. |
| 2009/0071217 | A1 | 3/2009 | Matsen et al. |
| 2009/0074905 | A1 | 3/2009 | Matsen et al. |
| 2009/0078362 | A1 | 3/2009 | Wilkerson et al. |
| 2010/0121475 | A1 | 5/2010 | Lyons |
| 2010/0225016 | A1 | 9/2010 | Prebil et al. |
| 2011/0006460 | A1 | 1/2011 | Vander Wel et al. |
| 2011/0206906 | A1 | 8/2011 | Rubin et al. |
| 2012/0255947 | A1 | 10/2012 | Matsen et al. |
| 2012/0291948 | A1 | 11/2012 | Matsen et al. |
| 2013/0075947 | A1 | 3/2013 | Bartel et al. |
| 2013/0082047 | A1 | 4/2013 | Matsen et al. |
| 2013/0134154 | A1 | 5/2013 | Matsen et al. |
| 2013/0149498 | A1 | 6/2013 | Wilkerson et al. |
| 2014/0076479 | A1 | 3/2014 | Bartel et al. |
| 2014/0102578 | A1 | 4/2014 | Bartel et al. |
| 2014/0117582 | A1 | 5/2014 | Wilkerson et al. |
| 2014/0183784 | A1 | 7/2014 | Bartel et al. |
| 2014/0232042 | A1 | 8/2014 | Bartel et al. |
| 2014/0238595 | A1 | 8/2014 | Blohowiak et al. |
| 2014/0374946 | A1 | 12/2014 | Prebil et al. |
| 2015/0165746 | A1 | 6/2015 | Prebil et al. |
| 2015/0217508 | A1 | 8/2015 | Rossi et al. |
| 2015/0291283 | A1 | 10/2015 | Lyons et al. |
| 2016/0031199 | A1 | 2/2016 | Merriman et al. |
| 2016/0186689 | A1 | 6/2016 | Bartel et al. |

\* cited by examiner

METHOD AND APPARATUS FOR CONTINUOUSLY FABRICATING A COMPOSITE SANDWICH STRUCTURE

FIELD

The present disclosure is generally related to composite laminates and, more particularly, to apparatus and methods for continuous manufacturing of composite sandwich structures.

BACKGROUND

Composite materials are widely used for aerospace applications. While structural composites are becoming more prevalent in airframe design, composites have long been used for various components of an aircraft's interior, primarily because of the material's light weight and high strength-to-weight ratio. Aircraft interiors may be less demanding structurally when compared to airframe parts, but they are still subject to demanding performance requirements such as mechanical strength, dimensional stability and low heat release in the event of a fire.

The most widely used composite application for aircraft interiors are sandwich structures, commonly referred to as sandwich panels. Sandwich panels are made using a thick, lightweight core sandwiched between two thin face sheets (e.g., plies of a fiber-reinforced material pre-impregnated with a matrix material), which increases the panel's stiffness with little added weight. Sandwich panels are cost-effective because the core material is less expensive and weighs less than the composite face sheets and can be cured or processed with the face sheets in a single operation. Sandwich panels are commonly used for flooring, ceilings, sidewalls, lavatories, stow bins, cargo hold liners and the like.

Flat sandwich panels are typically fabricated with flat press molding conducted at a high temperature and high pressure, in which a cored laminate is placed in a large press and crushed down to a predetermined thickness in a process commonly referred to as "crush core." Crush core is an efficient and economical process for fabrication of sandwich panels. One disadvantage to the core crush process is it is a non-continuous process in which individual sandwich panels are fabricated and trimmed. Another disadvantage to the crush core process is the challenge of fabricating sandwich panels within applicable tolerances. Otherwise, a costly and lengthy re-work process may be required or material waste may result if the damage is so extensive that it is beyond repair.

Further, many interior parts can include contoured shapes or other non-planar (e.g., complex) shapes. These contoured shapes are typically made from flat sandwich panels by a cut and fold process. In this process, a portion of one face sheet is removed to expose the core. Adhesive is then applied to the exposed core and the sandwich panel is folded to the desired position and clamped until the adhesive cures. While this process is economical, one disadvantage is the material waste associated with the cut and fold and the challenge of consistent fabrication of panels within the applicable tolerances.

Following final inspection of the sandwich panel, desired surface decorations are applied to individual sandwich panels. Examples of decorative surfaces typically include plastic films or paint. However, painting requires additional surface preparation steps, such as filling, sanding and primer application. A decorative film eliminates some of the surface-prep and finishing steps, but may add cost and weight to the part.

Accordingly, those skilled in the art continue with research and development efforts in the field of composite sandwich panels.

SUMMARY

In one embodiment, the disclosed method for continuously fabricating a composite sandwich structure includes the steps of: (1) moving a laminate, substantially continuously, through a preheating zone, wherein the laminate includes a first face sheet, a second face sheet and a core sandwiched between the first face sheet and the second face sheet; (2) preheating the laminate to a preforming temperature above a glass transition temperature of the laminate and below or equal to a crystalline melt temperature of the laminate as the laminate is being moved through the preheating zone; (3) moving the laminate, substantially continuously, through a consolidation zone; and (4) consolidating the laminate as the laminate is being moved through the consolidation zone to form a continuous length of the composite sandwich structure.

In another embodiment, the disclosed apparatus for continuously fabricating a composite sandwich structure includes a preheating device to preheat a laminate to a preforming temperature above a glass transition temperature of the laminate and below or equal to a crystalline melt temperature of the laminate as the laminate is moved, substantially continuously, through the preheating device, wherein the laminate comprises a first face sheet, a second face sheet and a core sandwiched between the first face sheet and the second face sheet, and a continuous compression molding device to consolidate the laminate as the laminate is moved, substantially continuously, through the continuous compression molding device to form a continuous length of the composite sandwich structure, and wherein the preheating device and the continuous compression molding device are arranged in a continuous linked sequence.

In yet another embodiment, the disclosed continuously fabricated composite sandwich structure includes a laminate comprising a first face sheet, a second face sheet and a core sandwiched between the first face sheet and the second face sheet, and wherein the composite sandwich structure is continuously fabricated by: (1) preheating the laminate to a preforming temperature above a glass transition temperature of the laminate and below or equal to a crystalline melt temperature of the laminate as the laminate is substantially continuously moved through a preheating zone; and (2) consolidating the laminate by heating the laminate to a thermoforming temperature sufficient to allow a free flow of a polymeric component of the laminate and incrementally forming the laminate at the thermoforming temperature into a desired shape as the laminate is substantially continuously moved through a consolidation zone arranged in a continuous linked sequence with the preheating zone to form a continuous length of the composite sandwich structure.

Other embodiments of the disclosed apparatus and method will become apparent from the following detailed description, the accompanying drawings and the appended claims.

DETAILED DESCRIPTION

Figure 1:
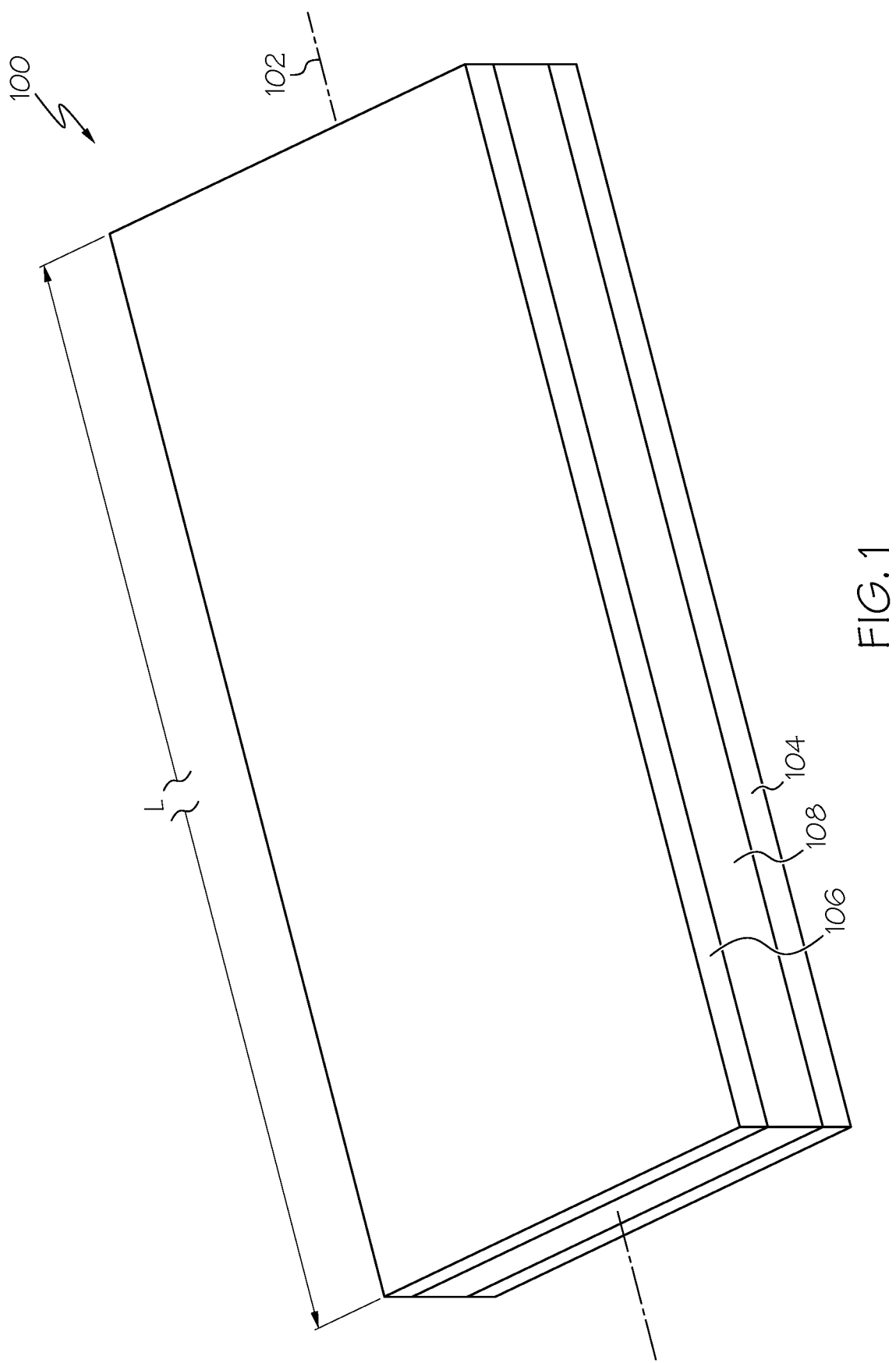
FIG. 1 is a schematic fragmentary perspective view of an embodiment of the disclosed continuously formed composite sandwich structure of indeterminate length.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

The present disclosure recognizes and takes into account that processes exist for the fabrication of composite laminates formed from a multiple ply stack (a stacked plurality of plies) of fiber-reinforced plastic material. In addition to non-continuous processes such as pressing and autoclave forming, there are continuous processes such as compression molding. However, conventional continuous processes (e.g., continuous compression molding) are not capable of successfully fabricating composite laminates formed from a core sandwiched between two plies of fiber-reinforced plastic material (composite sandwich structures). One reason for this lack of success is due to the fact that the sandwich structure is too stiff to be formed without cracking the core material and/or tearing the face sheets under the pressure applied by compression molding. Another reason is that the continuous process does not apply sufficient heat to the sandwich structure to maintain dimensional stability of the sandwich structure following thermal forming, which results in a springback effect that leads to the sandwich structure having an undesirable final shape.

The present disclosure also recognizes and takes into account that non-continuous processes exist for the fabrication of composite laminates formed from a core sandwiched between two plies of fiber-reinforced plastic material (composite sandwich structures). However, conventional non-continuous processes (e.g., pressing and autoclave forming) are not capable of producing sandwich structures in continuous lengths. Moreover, the processes mentioned above are not capable of producing sandwich structures that have a curvature, for example, along their length and/or width, or other complex shape.

Embodiments of the apparatuses and methods disclosed herein provide for the fabrication and forming of composite laminates formed from a core sandwiched between two plies of fiber-reinforced plastic material (composite sandwich structures) using a modified continuous compression molding technique or process. As will be described below in more detail, the composite sandwich structures (e.g., laminates and laminate parts) may be fabricated in a continuous process with consistent results that is, for example, without damage to the core and/or face sheets or springback. The embodiments disclosed herein may be employed in a wide range of applications, and may be especially suited for forming composite sandwich structures used in aircraft applications, which may include, without limitation, flooring, ceilings, sidewalls, lavatories, stow bins, and cargo hold liners. Further, the composite sandwich structures may be formed to have various cross-sectional shapes.

Figure 2:
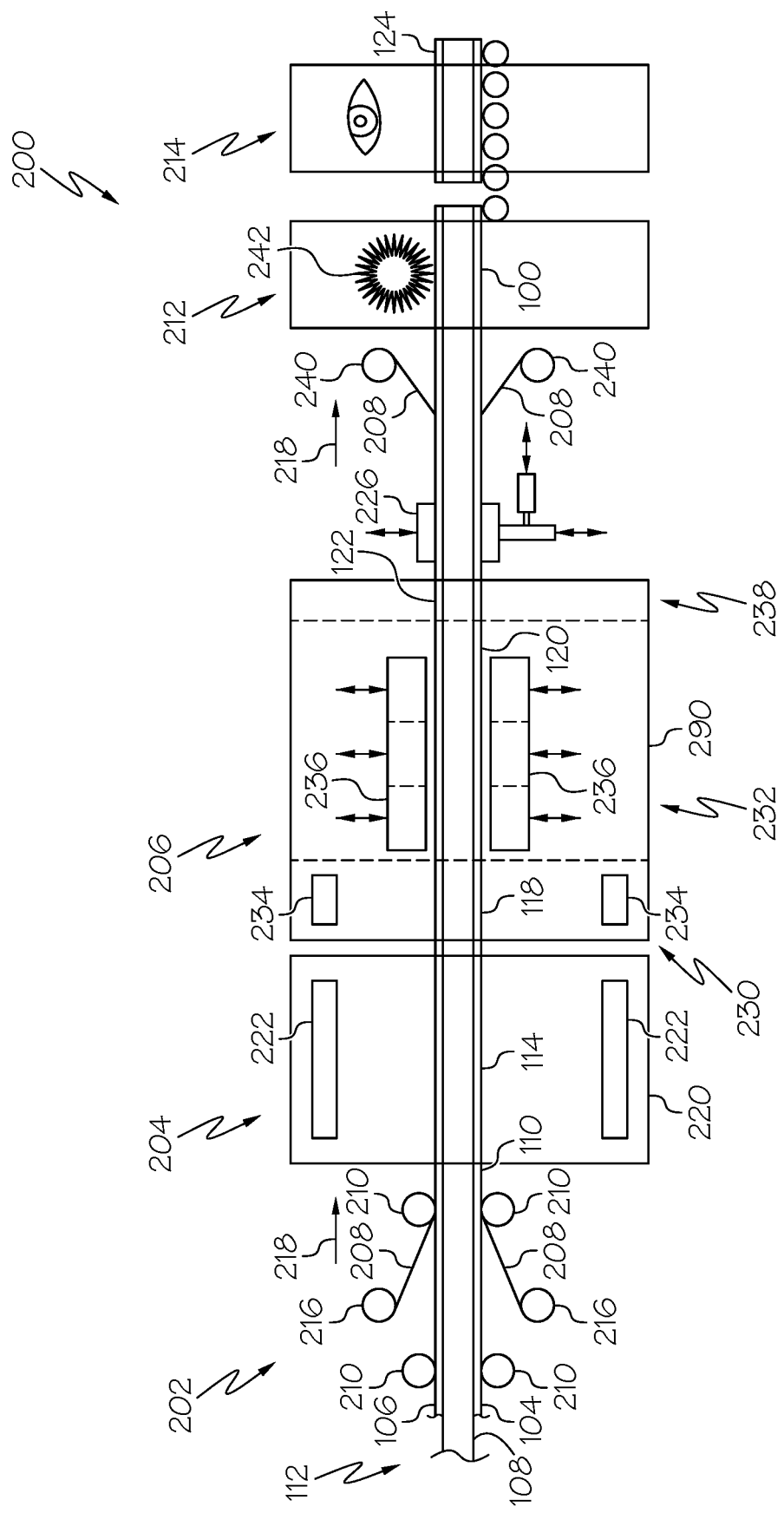
FIG. 2 is a schematic illustration of an embodiment of the disclosed apparatus for continuously fabricating the composite sandwich structure.

FIG. 1 is a fragmentary schematic perspective view of an embodiment of a composite sandwich structure 100 of indeterminate length L. The composite sandwich structure 100, also referred to as a sandwich panel, may be fabricated in continuous lengths according to the disclosed method 300 (FIG. 15) using a continuous compression molding (CCM) fabrication apparatus 200 (FIG. 2). Generally, as used here, "continuous" means an elongated material having a length that is orders of magnitude greater than its width. The composite sandwich structure 100 may be either straight, for example, as illustrated in FIG. 1, or have one or more curvatures along its length.

As an example, the composite sandwich structure 100 may have a longitudinal curvature formed along its length (e.g., approximately parallel to its longitudinal axis 102). As another example, the composite sandwich structure 100 may have a transverse curvature formed along its length (e.g., approximately perpendicular to its longitudinal axis 102). While the composite sandwich structure 100 illustrated in FIG. 1 has a generally rectangular cross section, a variety of other cross-sectional shapes are possible.

In an example construction, the composite sandwich structure 100 includes an outer first face sheet, or skin, 104, an outer second face sheet, or skin, 106, and core 108 sandwiched between the first face sheet 104 and the second face sheet 106. While only a single first face sheet 104 and a single second face sheet 106, opposite the first face sheet 104, are illustrated in FIG. 1, in other example constructions, more than one first face sheet 104 and/or more than one second face sheet 106 may be used.

The first face sheet 104 and the second face sheet 106 may typically be plies, sheets or layers of a fiber reinforcing material impregnated (e.g., pre-impregnated) with a polymer matrix material. As an example, the first face sheet 104 and the second face sheet 106 are layers of fiber-reinforced polymer prepreg.

The fiber reinforcement may be a woven or nonwoven fabric or tape formed from tows of the reinforcing material (e.g., bundles of reinforcing fibers or filaments). As non-limiting examples, the fiber reinforcement may be carbon fiber, glass fiber (s-type or e-type), aramid fiber and the like. The fibers within each of the first face sheet 104 and/or the second face sheet 106 may be oriented in a unidirectional or non-uniform arrangement, depending upon the particular application.

The polymer matrix material may be a thermoset (thermosetting) resin or a thermoplastic resin. As non-limiting examples, the matrix material may be an epoxy resin, a phenolic resin and the like.

The core 108 may be formed from any suitable polymer material. As non-limiting examples, the core 108 may be thermoplastic, polymeric foam and the like. The core 108 may be a solid structure (e.g., not containing substantial spaces or gaps) or a honeycomb structure (e.g., containing a plurality of cells). Thermoplastic matrix materials may also include polyetheretherketone (PEEK), polyetherketoneketone (PEKK), polyphenylsulfone (PPS) and polyetherimide (PEI).

Thus, the composite sandwich structure 100 includes a laminate formed from layers of the face sheets 104, 106 and the core 108 in a cured and consolidated composite form. The polymer matrix material of the first face sheet 104 and the second face sheet 106 and the polymer material of the core 108 may be the same or may be different.

FIG. 2 is a schematic illustration of an embodiment of the disclosed CCM fabrication apparatus, generally referred to herein as the apparatus, 200 used to form the composite sandwich structure 100. The apparatus 200 broadly includes a material supply zone 202, a preheating zone 204 and a consolidation zone 206. The apparatus 200 also includes a cutting zone 212 and an inspection zone 214.

The apparatus 200 also includes a pulsating drive mechanism 226. The pulsating drive mechanism 226 is configured to incrementally move a laminate 110 forward through the zones of the apparatus 200 during fabrication of the composite sandwich structure 100. In lieu of the pulsating drive mechanism 226, other types of mechanisms may be used for moving the laminate 110 along in a similar manner.

Multiple material layers 112 forming the composite sandwich structure 100 (e.g., first face sheet 104, second face sheet 106 and core 108) are supplied (e.g., to the supply zone 202) in continuous form. As an example, one or more of the material layers 112 may be supplied from continuous rolls (not shown) and are stacked into a laminate at the material supply zone 202. As another example, the material layers 112 may be supplied in the form of a pre-stacked laminate that is tacked together (not shown). Thus, in either example, a stack of the material layers 112, or the laminate 110 (e.g., a stacked laminate), exits the supply zone 202.

A substantially flat laminate 110 (e.g., stack of material layers 112) is introduced, fed or otherwise directed to the preheating zone 204, linearly in the direction of arrow 218. In an example implementation, the material layers 112 are fed to the preheating zone 204 along with sheet members 208 applied to outer surfaces of the laminate 110. As an example, the sheet members 208 are supplied in continuous form, for example, from supply rolls 216. The sheet members 208 are configured to protect the surfaces of the laminate 110 during a preforming operation and/or a forming operation of the composite sandwich structure 100. For example, the sheet members 208 are located between the outer surfaces of the laminate 110 and tool dies used to partially form or fully form the composite sandwich structure 100. As an example, the sheet members 208 are continuous sheets of a thin metal material. As a non-limiting example, the sheet members 208 are thin sheets of steel foil (e.g., between approximately 0.016 mm and approximately 0.024 mm thick).

In an example construction, the apparatus 200 may also include one or more guides 210 (e.g., rollers or other tooling elements) configured to maintain the orientation of the material layers 112 relative to each other through one or more zones of the apparatus 200. As an example, the guides 210 may be used to pre-align and/or guide the laminate 110 of the material layers 112, and the sheet members 208, to the preheating zone 204.

In an example implementation, the pulsating drive mechanism 226 of the apparatus 200 incrementally moves the laminate 110 substantially continuously, in a step-wise manner, through the preheating zone 204 and away from the material supply zone 202. In an example construction of the apparatus 200, the preheating zone 204 includes a preheating device 220 (e.g., an oven or furnace). The preheating device 220 may include a plurality of heating elements, or heaters, 222 for example, upper heating elements positioned above the laminate 110 and/or lower heating elements positioned below the laminate 110.

The preheating device 220 is configured to heat the laminate 110 (e.g., the stacked laminate of the core 108 sandwiched between the first face sheet 104 and the second face sheet 106 provided from the material supply zone 202) to a pre-selected temperature that is sufficiently high to cause softening of the laminate 110 so that is may be subsequently formed, for example, to allow preforming of the laminate 110 in a preforming zone 224 and/or thermoforming of the laminate 110 in the consolidation zone 206 without damaging any of the material layers 112 (e.g., the first face sheet 104, the second face sheet 106 and/or the core 108). As an example, the preheating device 220 heats the laminate 110 to a preforming temperature above the glass transition temperature of the laminate 110 (e.g., the material layers 112) and below or equal to the crystalline melt temperature of the laminate 110 (e.g., the material layers 112). In other words, the laminate 110 is heated to a pliable preforming temperature by the preheating device 220.

In an example construction, the preheating device 220 is an infrared (IR) convection oven that utilizes short wave electric infrared heaters, medium wave electric infrared heaters, long wave electric infrared heaters or some combination thereof as its heating elements 222. In another example construction, the preheating device 220 is a halogen oven or a halogen convection oven that utilizes halogen lamps as its heating elements 222. In another example construction, the preheating device 220 is a gas fired convection oven. In yet another example construction, the preheating device 220 is an electric convection oven.

In this example implementation, a preheated laminate 114 (e.g., the stacked laminate of the core 108 sandwiched between the first face sheet 104 and the second face sheet 106 after being preheated by the preheating zone 204) exits the preheating zone 204 and moves into either the preforming zone 224 (FIG. 3) for partial forming, or preforming, of the preheated laminate 114 or the consolidation zone 206 (FIG. 2) for consolidating and final forming of the preheated laminate 114.

Figure 3:
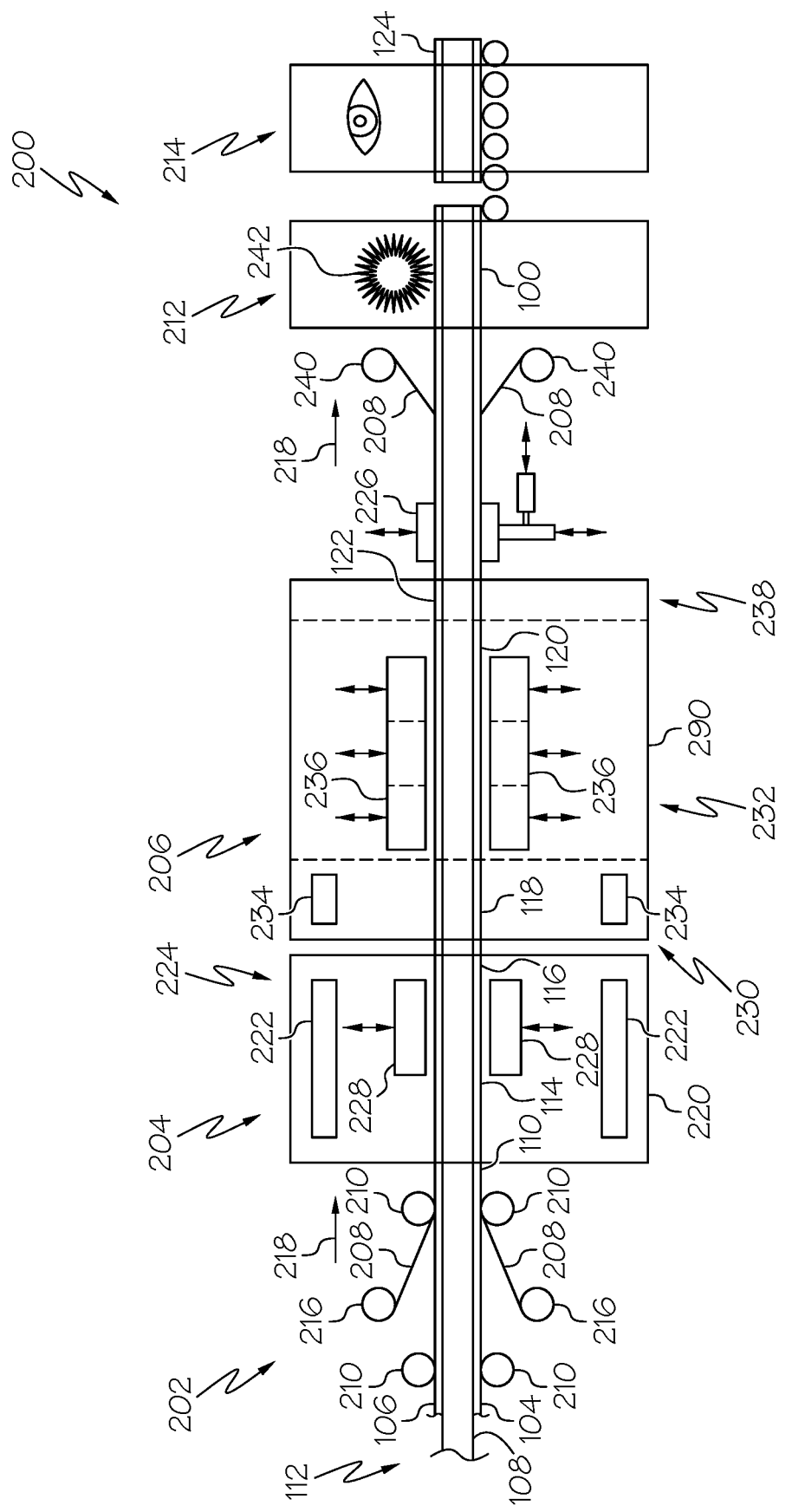
FIG. 3 is a schematic illustration of another embodiment of the disclosed apparatus for continuously fabricating the composite sandwich structure.

FIG. 3 is a schematic illustration of another embodiment of the disclosed apparatus 200 used to form the composite sandwich structure 100. Optionally, the apparatus 200 includes the preforming zone 224. In another example implementation, the pulsating drive mechanism 226 of the apparatus 200 incrementally moves the preheated laminate 114 substantially continuously, in a step-wise manner, through the preforming zone 224. In an example construction of the apparatus 200, the preforming zone 224 includes the plurality of heating elements 222 and one or more (e.g., a series) of preforming tool dies 228. At least some of the preforming tool dies 228 have first and second die halves that have a progressive shape. The preforming tool die 228 pre-molds or pre-forms at least a portion of a curvature or feature into the preheated laminate 114. While only one preforming tool die 228 is shown in FIG. 3, the preforming zone 224 may include any number of preforming tool dies 228. Also, it should be noted here that the preforming tool dies 228 may not be separate from each other, but rather may include a single die that has multiple separate die shapes formed therein, so that with each compression of the preheated laminate 114 by this single die, multiple differing portions of the desired shape are formed.

The number of preforming tool dies 228 or the number of separate die shapes formed in the preforming tool die 228 may depend upon the desired shape of the final composite sandwich structure 100. As an example, large shape changes (e.g., large curvatures) may require incremental die forming utilizing a larger number of preforming tool dies 228 or die shapes prior to final forming of the composite sandwich structure 100 at the consolidation zone 206.

In this example implementation, a preformed laminate 116 (e.g., the stacked laminate of the core 108 sandwiched between the first face sheet 104 and the second face sheet 106 after being preheated by the preheating zone 204 and preformed by the preforming zone 224) exits the preforming zone 224 and moves into the consolidation zone 206 for consolidating and final forming of the preheated laminate 114.

In an example construction, the preheating operation and the preforming operation are integrated into a single zone, also generally referred to as the preforming zone 224. Accordingly, in an example construction, the preheating device 220 and the preforming tool dies 228 are integrated into the same unit or structure defining the preforming zone 224. In other words, at least a portion of a curvature or feature is preformed into the preheated laminate 114 by the preforming tool dies 228 while the preformed laminate 116 is within the preheating device 220 and is being maintained at the pliable preforming temperature.

Referring to FIGS. 2 and 3, in another example implementation, the pulsating drive mechanism 226 of the apparatus 200 incrementally moves the preheated laminate 114 (FIG. 2) substantially continuously, in a step-wise manner, through the consolidation zone 206 and away from the preheating zone 204. Alternatively, the pulsating drive mechanism 226 of the apparatus 200 incrementally moves the preformed laminate 116 (FIG. 3) substantially continuously, in a step-wise manner, through the consolidation zone 206 and away from the preforming zone 224.

In an example construction, an output end of the preheating zone 204 (FIG. 2) or the preforming zone 224 (FIG. 3) is proximate to (e.g., at or near) or is adjacent to (e.g., next to or adjoining) an input end of the consolidation zone 206 so that cooling of the preheated laminate 114 (FIG. 2), or preformed laminate 114 (FIG. 3), is minimized or prevented.

In an example construction of the apparatus 200, the consolidation zone 206 includes a continuous compression molding device 290. As the preheated laminate 114 (FIG. 2), or the preformed laminate 116 (FIG. 3), moves forward, it first enters a heating zone 230 of the consolidation zone 206. The heating zone 230 is configured to further heat the preheated laminate 114, or the preformed laminate 116, to a thermoforming temperature above the crystalline melt temperature, for example, a temperature that is sufficiently high to cause or allow a free flow of the polymeric component of the laminate 110, for example, the polymeric component of the matrix material in the material layers 112 (e.g., the first face sheet 104 and/or the second face sheet 106). In an example construction of the apparatus 200, heating zone 230 includes at least one heater 234 that heats the preheated laminate 114, or the preformed laminate 116, to the thermoforming, or consolidating, temperature. The heater 234 may include any of various devices suitable for heating the laminate 110 (e.g., the preheated laminate 114 or preformed laminate 116), including but not limited to, an oven or infrared heat lamps.

In this example implementation, a heated laminate 118 (e.g., the stacked laminate of the core 108 sandwiched between the first face sheet 104 and the second face sheet 106 after being heated by the heating zone 230) exits the heating zone 230 and moves into a forming zone 232 of the consolidation zone 206 for consolidating and final forming of the heated laminate 118.

In another example implementation, the pulsating drive mechanism 226 of the apparatus 200 incrementally moves the heated laminate 118 substantially continuously, in a step-wise manner, through the forming zone 232. In an example construction of the apparatus 200, the forming zone 232 includes one or more (e.g., a series) of forming tool dies 236. At least some of the forming tool dies 236 have first and second die halves that have a progressive shape. The forming tool dies 236 molds or forms at least a portion of a final curvature or feature into the heated laminate 118. While only three forming tool dies 236 are shown in FIGS. 2 and 3, the forming zone 232 may include any number of forming tool dies 236. Also, it should be noted here that the forming tool dies 236 may not be separate from each other, but rather may include a single die that has multiple separate die shapes formed therein, so that with each compression of the heated laminate 118 by this single die, multiple differing portions of the desired shape are formed.

As the heated laminate 118 moves forward into the forming zone 232, the forming tool dies 236 are brought down, for example, collectively or individually, at a predefined pressure sufficient to compress and consolidate (e.g., allow free-flow of the polymeric matrix material) the various material layers 12 into the desired shape and/or thickness. As described above, the layers of the sheet members 208 are positioned over the outer surfaces of the heated laminate 118 so that the forming tool dies 236 contact sheet members 208, and not the heated laminate 118.

As the forming tool dies 236 are opened, the heated laminate 118 is incrementally advanced within the consolidation zone 206. After which, the forming tool dies 236 are closed again, causing successive sections of the heated laminate 118 to be compressed within different temperature zones, and thereby consolidate the laminate core 108 sandwiched between the first face sheet 104 and the second face sheet 106 in the compressed section. This process is repeated for each temperature zone of the forming tool dies 236 as the heated laminate 118 is incrementally advanced through the consolidation operation (e.g., the consolidation zone 206).

The number of forming tool dies 236 or the number of separate die shapes formed in the forming tool die 236 may depend upon the desired shape of the final composite sandwich structure 100. As an example, large shape changes (e.g., large curvatures) may require incremental die forming utilizing a larger number of forming tool dies 236 or die shapes.

In this example implementation, a consolidated (e.g., fully formed and compressed) laminate 120 (e.g., the stacked laminate of the core 108 sandwiched between the first face sheet 104 and the second face sheet 106 after being heated by the heating zone 230 and formed by the forming zone 232) exits the consolidation zone 206.

Any curing process required for the laminate 110 (e.g., thermoset curing) may occur within the consolidation zone 206, for example, during consolidation (e.g., heating and forming) of the laminate 110 (e.g., within the heating zone 230 and the forming zone 232).

Referring still to FIGS. 2 and 3, in another example implementation, the consolidated laminate 120 then enters a cooling zone 238 of the consolidation zone 206, which is separated from the consolidation zone 206. In the cooling zone 238, the temperature of the consolidated laminate 120 is brought below the free-flowing temperature of the matrix material in the material layers 112, thereby causing the fused or consolidated laminate 120 to harden to its ultimate pressed shape and form the composite sandwich structure 100. In an example construction, the cooling zone 238 may include, without limitation, active cooling of the tooling dies that contact the consolidated laminate 120 or fans or blowers that pass ambient or chilled air over the consolidated laminate 120 as it exits the forming zone 232.

In this example implementation, a consolidated and cooled laminate 122 (e.g., the stacked laminate of the core 108 sandwiched between the first face sheet 104 and the second face sheet 106 after being cooled by the cooling zone 238) then exits the consolidation zone 206 where the sheet members 208 are removed from the cooled laminate 122 (e.g., the continuous length of the composite sandwich structure 100) and taken up, for example, on take-up rolls 240.

In another example implementation, the pulsating drive mechanism 226 of the apparatus 200 incrementally moves the composite sandwich structure 100 to the cutting zone 212 and away from the consolidation zone 206. In an example construction of the apparatus 200, the cutting zone 212 includes a saw or other cutting tool 242 configured to cut the continuous composite sandwich structure 100 to a discrete or finite length and/or trim away excess material.

In another example implementation, a cut section 124 of the composite sandwich structure 100 then enters the inspection zone 214, which is separated from the cutting zone 212, where the section 124 of the composite sandwich structure 100 is inspected. Inspection of the section 124 of the composite sandwich structure 100 may include any visual inspection or other non-destructive inspection or testing operation. In an example construction, the apparatus 200 may include a material handling mechanism 244 (e.g., material rollers) configured to move the cut sections 124 of the composite sandwich structure 100 from the cutting zone 212 to the inspection zone 214.

The final composite sandwich structure 100 may then be removed at the end of the apparatus 200.

Figure 4:
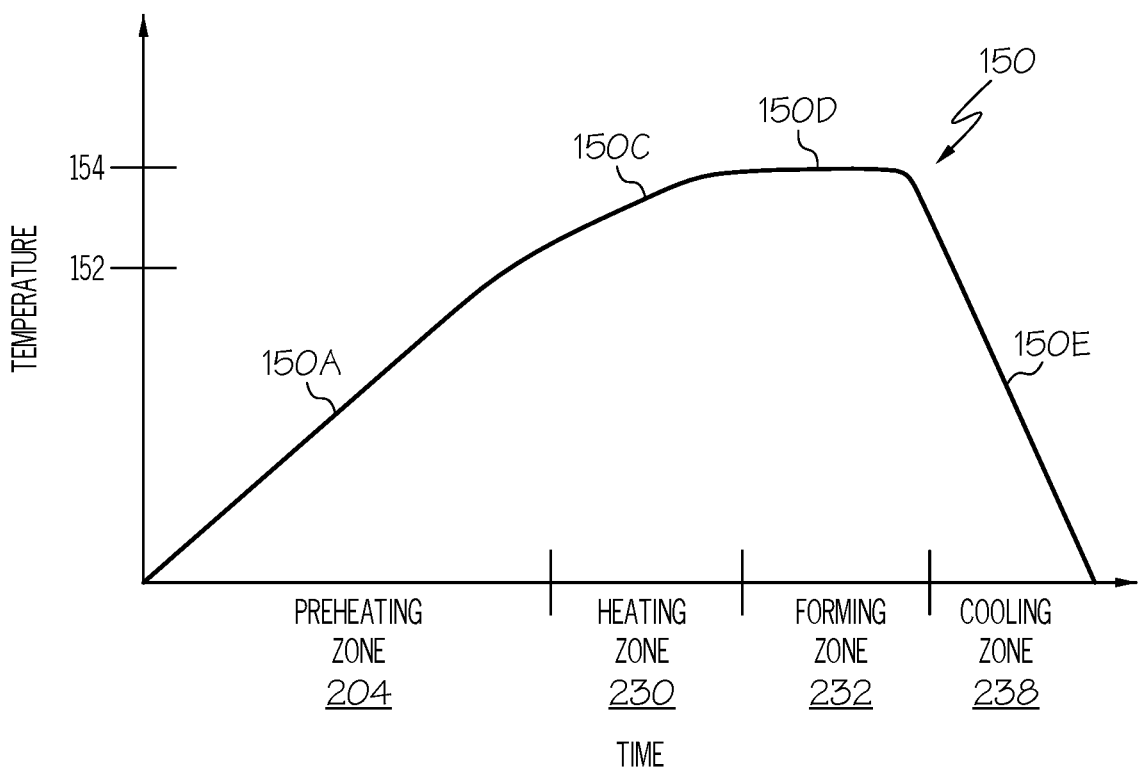
FIG. 4 is an illustration of a temperature profile of the disclosed continuously formed composite sandwich structure during a preheating and consolidation process.
Figure 5:
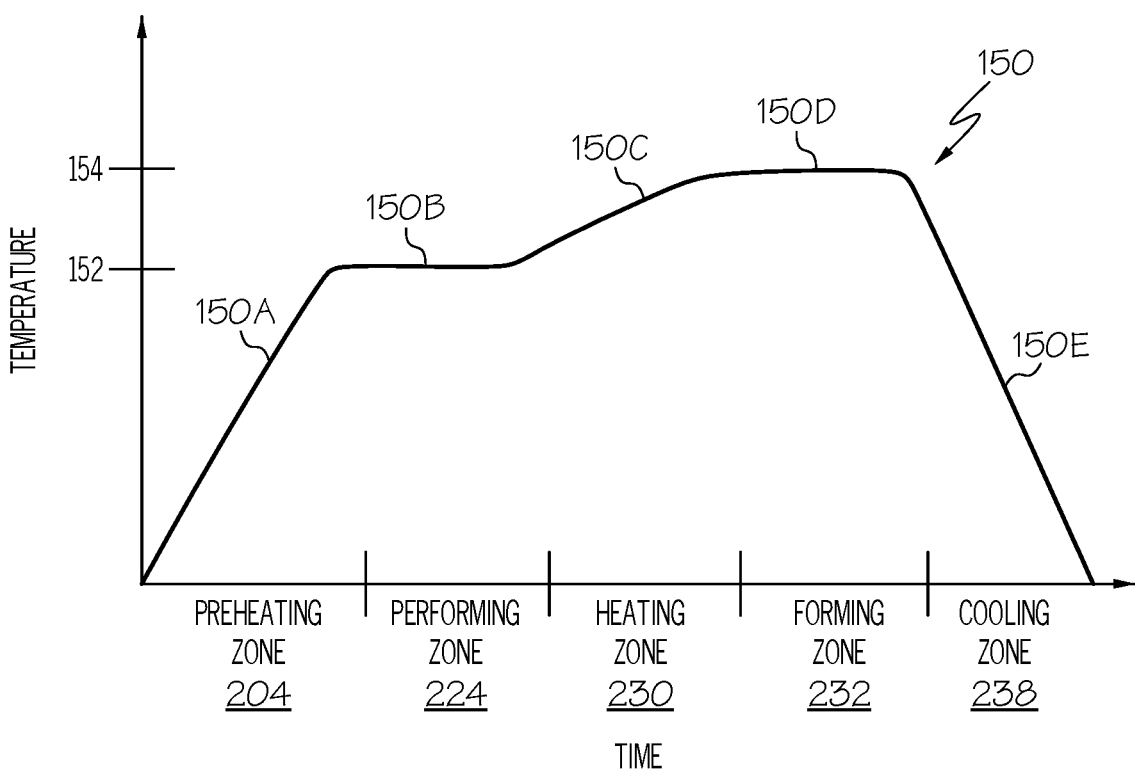
FIG. 5 is an illustration of a temperature profile of the disclosed continuously formed composite sandwich structure during a preheating, preforming and consolidation process.

FIGS. 4 and 5 graphically illustrates example temperature profiles 150 of the laminate 110 as a function of time, which also corresponds to a position of the laminate 110 as it moves through the apparatus 200. During the preheating operation, the temperature of the laminate 110 is initially ramped up, at 150A, before reaching and being held at the preselected preforming temperature 152, at 150B, which may be controlled by the amount of preheating affected within the preheating zone 204 and the rate at which the laminate 110 passes through the preheating zone 204. As illustrated in FIG. 5, if the laminate 110 (e.g., the preheated laminate 114) (FIGS. 2 and 3) is subjected to the preforming operation, it remains at the preforming temperature 152, at 150B, as it progresses through the sets of preforming tool dies 228 of the preforming zone 224 (FIG. 3). During the heating operation, the temperature of the laminate 110 (e.g., the preheated laminate 114 or the preformed laminate 116) is further ramped up, at 150C, before reaching and being held at the preselected thermoforming temperature 154, at 150D, which may be controlled by the amount of heating affected within the heating zone 230 and the rate at which the laminate 110 passes through the heating zone 230. The laminate 110 (e.g., the heated laminate 118) remains at the thermoforming temperature 154, at 150D, as it progresses through the sets of forming tool dies 236 in the forming zone 232 (FIGS. 2 and 3). The laminate 110 (e.g., the consolidated laminate 120) is then subjected to a cool down ramp, at 150E, which may be controlled by the amount of cooling affected within the cooling zone 238 and the rate at which the laminate 110 passes through the cooling zone 238.

As previously mentioned, the section of the laminate 110 disposed within the preforming zone 224 is maintained substantially at the preselected preforming temperature 152 during preforming. The section of the laminate 110 disposed within the forming zone 232 is maintained substantially at the preselected thermoforming temperature 154 during forming (e.g., compression molding). As illustrated, the thermoforming temperature 154 is at least as high or higher than the preforming temperature 152. By maintaining the temperature of the laminate 110 above its glass transition and below or equal to its crystalline melt temperature throughout the preheating and optional preforming process and above its crystalline melt temperature through the forming, or molding, process, including temperature ramp-up and cool down, favorable performance and/or structural properties of the laminate 110 are maintained, and are therefore exhibited by the fully formed composite sandwich structure 100.

The processing or operational flow rate of the laminate 110 through the apparatus 200, or the feed rate through each of the zones, is dictated by the flow rate of the laminate 110 through the consolidation zone 206 during the consolidating operation (e.g., the heating and forming operations). Thus, the preheating zone 204 (FIG. 2), or the preforming zone 224 (FIG. 3), is designed to sufficiently preheat the laminate 110 to the preforming temperature 152 during the preheating operation, or the preforming operation, based on the flow rate of the laminate 110 through the consolidation zone 206.

Figure 6:
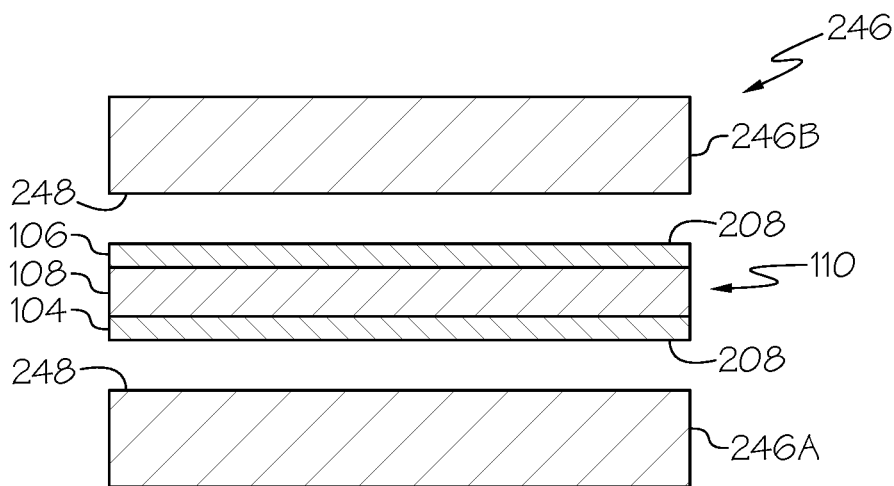
FIG. 6 is a schematic cross-sectional view of an embodiment of tool dies used to form the composite sandwich structure.

FIG. 6 is a schematic transverse cross-sectional illustration of an embodiment of a tool die 246 of the apparatus 200 used to fabricate the composite sandwich structure 100. In this embodiment, the tool dies 246 may be examples of the forming tool dies 236 used to form or mold the laminate 110, for example, the heated laminate 118 during the forming operation (e.g., in the forming zone 232) to form a substantially flat consolidated laminate 120 (e.g., the composite sandwich structure 100).

In an example implementation, a substantially flat laminate 110 is preheated to the preforming temperature during the preheating operation (e.g., in the preheating zone 204) and the preheated laminate 114 is heated to the thermoforming temperature during the heating operation (e.g., in the heating zone 230). Incremental movement of the laminate 110 positions a section of the laminate 110 (e.g., a portion or section of the heated laminate 118) between an opposing pair of movable tool die halves 246A and 246B. The die halves 246A, 246B are forced against the laminate 110 (e.g., the heated laminate 118), as indicated by directional force arrows 250, to apply a forming pressure to the laminate 110. Each of the die halves 246A and 246B has a flat tool surface 248 thereby forming a substantially flat laminate 110 (e.g., consolidated laminate 120). To fabricate a substantially flat composite sandwich structure 100, each subsequent tool die 246 (e.g., forming tool dies 236) include die halves 246A and 246B each having a flat tool surface 248.

Figure 7:
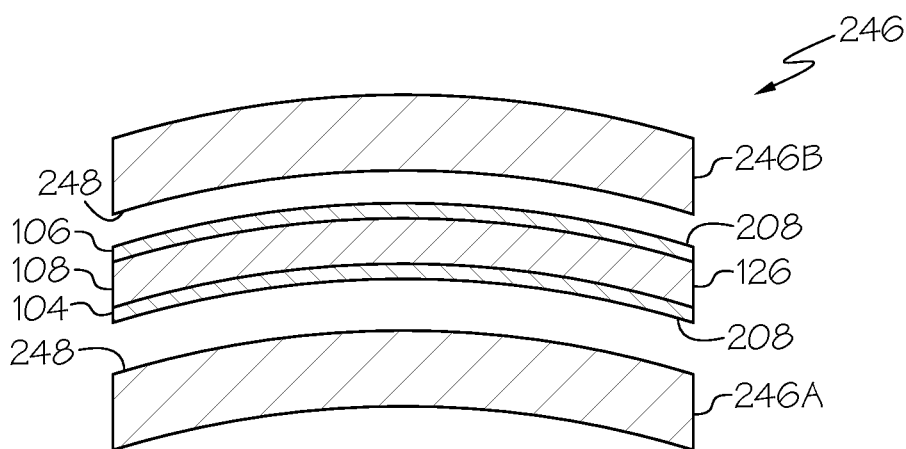
FIG. 7 is a schematic cross-sectional view of another embodiment of the tool dies used to form the composite sandwich structure.

FIG. 7 is a schematic transverse cross-sectional illustration of another embodiment of the tool die 246 of the apparatus 200 used to fabricate the composite sandwich structure 100 having a curvature 126. In this embodiment, the tool dies 246 may be examples of the preforming tool dies 228 used to preform the laminate 110, for example, the preheated laminate 114 during the preforming operation (e.g., in the preforming zone 224) to form the preformed laminate 116, or the forming tool dies 236 used form or mold the laminate 110, for example, the heated laminate 118) during the forming operation (e.g., in the forming zone 232) to form a curved consolidated laminate 120 (e.g., the composite sandwich structure 100).

In an example implementation, the substantially flat laminate 110 is preheated to the preforming temperature during the preheating operation (e.g., in the preheating zone 204). Incremental movement of the laminate 110 positions a section of the laminate 110 (e.g., a portion or section of the preheated laminate 114) between the opposing pair of movable tool die halves 246A and 246B. The die halves 246A, 246B are forced against the laminate 110 (e.g., the preheated laminate 114), as indicated by directional force arrows 250, to apply a preforming pressure to the laminate 110. Each of the die halves 246A and 246B has a curved tool surface 248 thereby forming a curved laminate 110 (e.g., preformed laminate 116). As an example, a first die half 146A has a convex-curved tool surface 248 and a second die half 246B has a concave-curved tool surface 248. To fabricate the preformed laminate 116 having a curvature, each subsequent tool die 246 (e.g., preforming tool dies 228) include die halves 246A and 246B each having a curved surface 248. To fabricate the preformed laminate 116 having a more pronounced curvature, each subsequent tool die 246 (e.g., preforming tool dies 228) include die halves 246A and 246B each having an incrementally sharper curved surface 248.

In another example implementation, the substantially flat laminate 110 is preheated to the preforming temperature during the preheating operation (e.g., in the preheating zone 204), optionally, the laminate (e.g., the preheated laminate 114) is preformed during the preforming operation (e.g., in the preforming zone 224) and the laminate 110 (e.g., the preheated laminate 114 or preformed laminate 116) is heated to the thermoforming temperature during the heating operation (e.g., in the heating zone 230). Incremental movement of the laminate 110 positions a section of the laminate 110 (e.g., a portion or section of the heated laminate 118) between the opposing pair of movable tool die halves 246A and 246B. The die halves 246A, 246B are forced against the laminate 110 (e.g., the heated laminate 118), as indicated by directional force arrows 250, to apply the forming pressure to the laminate 110. Each of the die halves 246A and 246B has a curved tool surface 248 thereby forming a curved laminate 110 (e.g., consolidated laminate 120). As an example, a first die half 146A has a convex-curved tool surface 248 and a second die half 246B has a concave-curved tool surface 248. As another example, the first die half 146A has the concave-curved tool surface 248 and the second die half 246B has the convex-curved tool surface 248. To fabricate the consolidated laminate 120 (e.g., the composite sandwich structure 100) having the curvature 126, each subsequent tool die 246 (e.g., forming tool dies 236) include die halves 246A and 246B each having a curved surface 248. To fabricate the consolidated laminate 120 (e.g., the composite sandwich structure 100) having a more pronounced curvature 126, each subsequent tool die 246 (e.g., forming tool dies 236) include die halves 246A and 246B each having an incrementally sharper curved surface 248.

Figure 8:
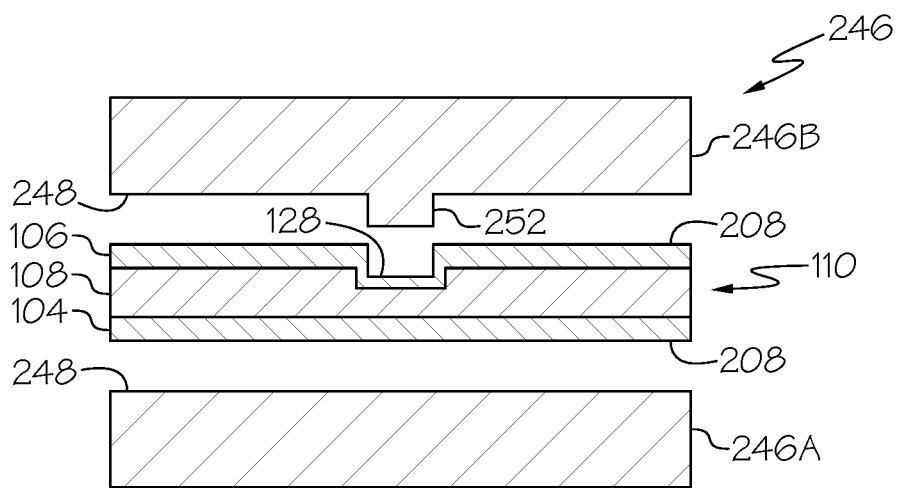
FIG. 8 is a schematic cross-sectional view of another embodiment of the tool dies used to form the composite sandwich structure.

FIG. 8 is a schematic transverse cross-sectional illustration of another embodiment of the tool die 246 of the apparatus 200 used to fabricate the composite sandwich structure 100 having one or more surface features 128. In this embodiment, the tool dies 246 may be examples of the forming tool dies 236 used to form or mold the laminate 110, for example, the heated laminate 118 during the forming operation (e.g., in the forming zone 232) to form a consolidated laminate 120 (e.g., the composite sandwich structure 100) having the surface feature 128 formed therein.

In an example implementation, the substantially flat laminate 110 is preheated to the preforming temperature during the preheating operation (e.g., in the preheating zone 204), optionally, the laminate (e.g., the preheated laminate 114) is preformed during the preforming operation (e.g., in the preforming zone 224) and the laminate 110 (e.g., the preheated laminate 114 or preformed laminate 116) is heated to the thermoforming temperature during the heating operation (e.g., in the heating zone 230). Incremental movement of the laminate 110 positions a section of the laminate 110 (e.g., a portion or section of the heated laminate 118) between the opposing pair of movable tool die halves 246A and 246B. The die halves 246A, 246B are forced against the laminate 110 (e.g., the heated laminate 118), as indicated by directional force arrows 250, to apply the forming pressure to the laminate 110. Each of the die halves 246A and 246B has a protrusion 252 extending from the tool surface 248 thereby forming a laminate 110 (e.g., consolidated laminate 120) having the surface feature 128. As an example, the first die half 146A has a substantially flat or curved tool surface 248 and the second die half 246B has a substantially flat or curved tool surface 248 corresponding to the shape of the tool surface 248 of the first die half 246A and one or more protrusions 252. To fabricate the consolidated laminate 120 (e.g., the composite sandwich structure 100) having the surface feature 128, one of the die halves 246A and 246B of each subsequent tool die 246 (e.g., forming tool dies 236) includes the protrusion 252. To fabricate the consolidated laminate 120 (e.g., the composite sandwich structure 100) having a more pronounced surface feature 128, one of the die halves 246A and 246B of each subsequent tool die 246 (e.g., forming tool dies 236) includes an incrementally larger protrusion 252.

In another example embodiment, the disclosed apparatus 200 may include at least one of a texturing zone 254 and/or a coating zone 260 or a combination of the texturing zone 254 and the coating zone 260 (e.g., a coating-texturing zone 266 or a texturing-coating zone 272) to apply at least one of a surface texture 132 and/or a surface coating 136 to at least one surface of the composite sandwich structure 100 in a continuous process. As will become clear to one skilled in the art, depending on the texturing process and/or coating process used, the order in which the surface texture 132 and/or the surface coating 136 is applied to at least one surface of the composite sandwich structure 100 may vary (e.g., the sequential, or in-line, order of the texturing zone 254 and/or the coating zone 260).

Figure 9:
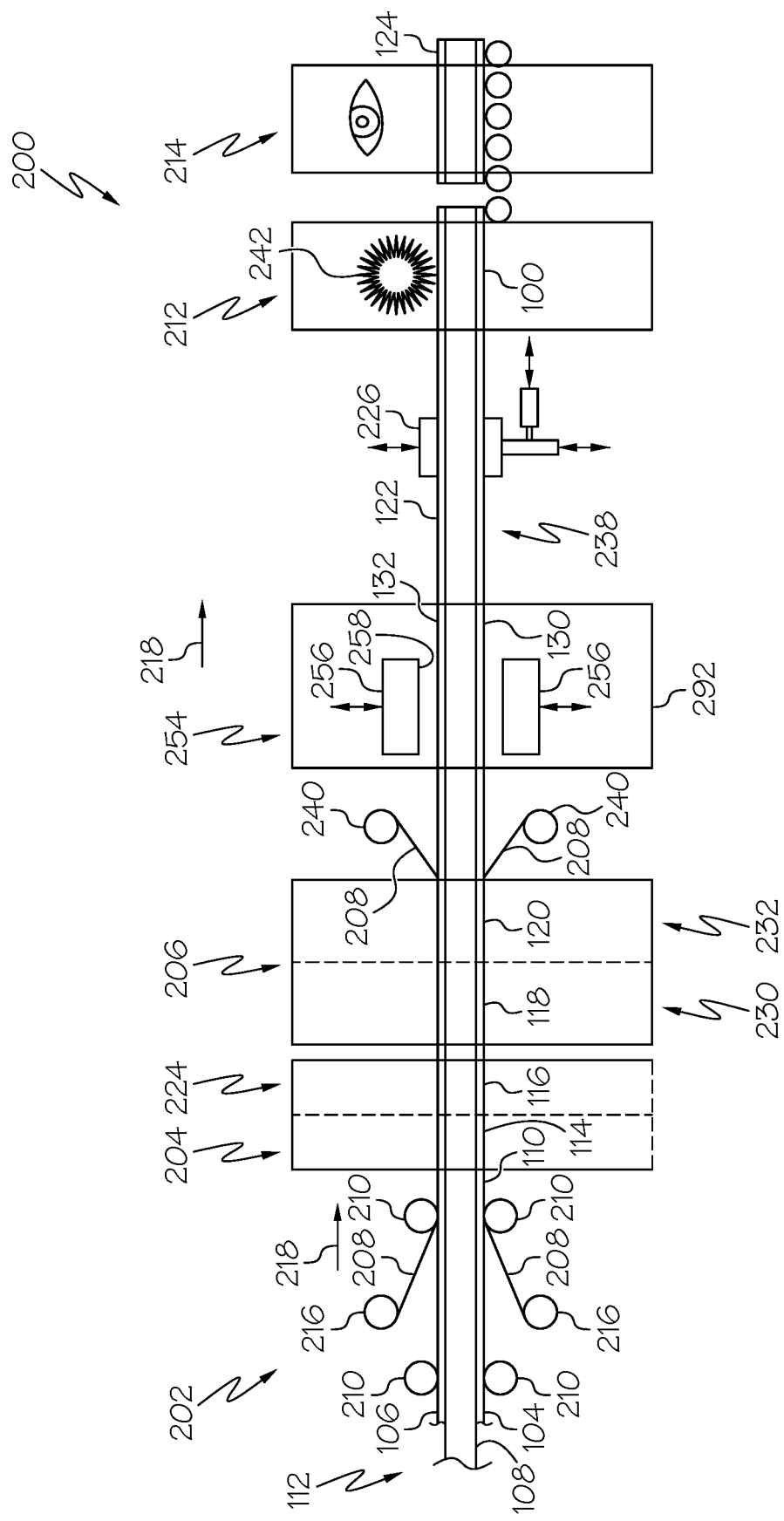
FIG. 9 is a schematic illustration of another embodiment of the disclosed apparatus for continuously fabricating the composite sandwich structure.

FIG. 9 is a schematic illustration of another embodiment of the disclosed apparatus 200 used to form the composite sandwich structure 100. In this embodiment, the apparatus 200 also includes the texturing zone (e.g., a texture-stamping zone) 254. In an example implementation, the pulsating drive mechanism 226 incrementally moves the consolidated laminate 120 substantially continuously, in a step-wise manner, through the texturing zone 254 and away from the consolidation zone 206 (e.g., the forming zone 232). In an example construction of the apparatus 200, the texturing zone 254 includes a texturing device 292 that includes one or more texture-stamping tool dies 256. At least some of the texture-stamping tool dies 256 have first and second die halves that have a textured tool surface 258. In an example construction, the textured tool surface 258 is integral to the texture-stamping tool dies 256. In another example construction, the textured tool surface 258 take the form of removable inserts coupled to the texture-stamping tool dies 256. The texture-stamping tool dies 256 stamps, forms or otherwise imparts a surface texture 132 into at least one surface of the laminate 110 (e.g., the consolidated laminate 120).

In an example construction, an output end of the consolidation zone 206 (e.g., the forming zone 232) is proximate to (e.g., at or near) or is adjacent to (e.g., next to or adjoining) an input end of the texturing zone 254 so that cooling of the consolidated laminate 120 is minimized. In other words, after exiting the consolidation zone 206, the laminate 110 (e.g., the consolidated laminate 120) is maintained at a temperature sufficiently high to impart the surface texture 132 to at least one surface of the laminate 110 (e.g., the consolidated laminate 120).

As the consolidated laminate 120 moves forward into the texturing zone 254, the texture-stamping tool dies 256 are brought down, for example, collectively or individually, at a predefined pressure sufficient to impart the surface texture 132 into the consolidated laminate 120.

In the illustrated embodiment, the sheet members 208 are removed from the outer surfaces of the laminate 110 (e.g., the consolidated laminate 120) before the texturing (e.g., texture-stamping) operation (e.g., entering the texturing zone 254) so that the texture-stamping tool dies 256 make direct contact with the outer surface of the laminate 110 (e.g., the consolidated laminate 120) to impart the surface texture 132. However, in other example implementations, the sheet members 208 may be removed from the outer surfaces of the laminate 110 (e.g., the consolidated laminate 120) after the texture-stamping operation (e.g., entering the texturing zone 254) so that the texture-stamping tool dies 256 make direct contact with the sheet member 208 to impart the surface texture 132 the outer surface of the laminate 110 (e.g., the consolidated laminate 120) through the sheet member 208.

In the illustrated embodiment, the pulsating drive mechanism 226 is located after the texturing zone 254. However, in other example constructions of the apparatus 200, the pulsating drive mechanism 226 may be positioned at other locations along the apparatus 200.

In the illustrated embodiment, a textured laminate 130 enters the cooling zone 238, for example, located after the texturing zone 254, where the temperature of the textured laminate 130 is brought below the free-flowing temperature of the matrix material in the material layers 112, thereby causing the consolidated and textured laminate 130 to harden to its ultimate shape and form the composite sandwich structure 100 having the desired surface texture 132.

Figure 10:
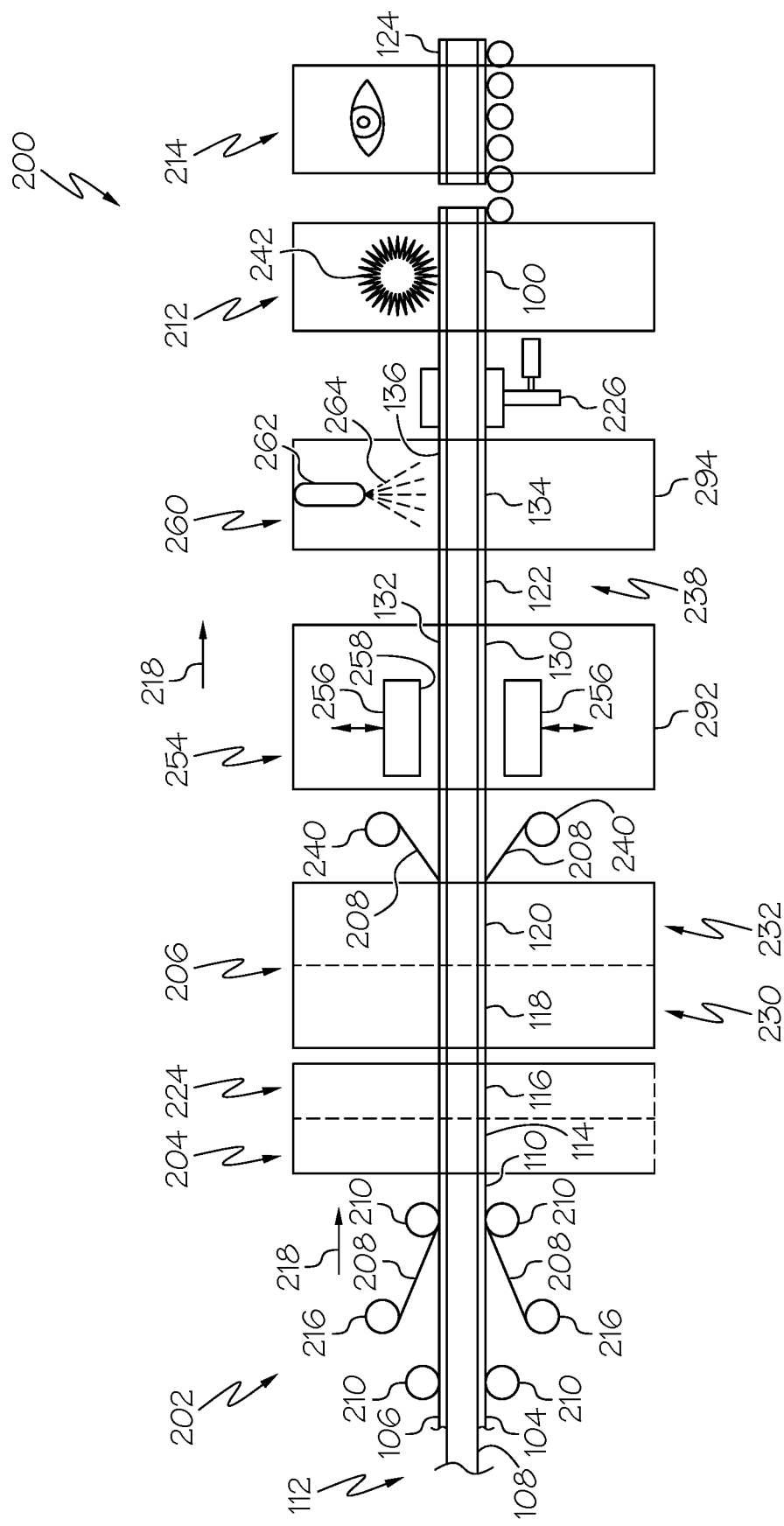
FIG. 10 is a schematic illustration of another embodiment of the disclosed apparatus for continuously fabricating the composite sandwich structure.

FIG. 10 is a schematic illustration of another embodiment of the disclosed apparatus 200 used to form the composite sandwich structure 100. In this embodiment, the apparatus 200 also includes a coating zone 260. In an example implementation, the pulsating drive mechanism 226 incrementally moves the laminate 110 (e.g., the textured laminate 130) substantially continuously, in a step-wise manner, through the coating zone 260. In another example implementation, the apparatus 200 may not include the texturing zone 254 (not shown). In this embodiment, the pulsating drive mechanism 226 incrementally moves the laminate 110 (e.g., the cooled laminate 122) substantially continuously, in a step-wise manner, through the coating zone 260. In an example construction of the apparatus 200, the coating zone 260 includes a coating device 294 that includes one or more applicators 262. The applicator 262 is configured to impart a surface coating 136 onto at least one surface of the laminate 110 (e.g., the consolidated, optionally textured, and cooled laminate) to form a coated laminate 134. In an example, the applicator 262 is a sprayer configured to apply a liquid coating 264 such as, and without limitation, paint (e.g., a colored paint, an ultraviolet (UV) paint, etc.), a gloss coating, a metallic surface-finish coating, a protective coating and the like, to at least one surface of the laminate 110. In other examples (not shown), the applicator 262 may include other types of mechanisms for applying the coating 264 such as brushes, rollers and the like.

While the illustrated embodiment shows the applicator 262 applying the coating 264 to only one surface of the laminate 110, additional applicators 262 may be used to apply coating 264 to both surfaces of the laminate 110 so that both surfaces of the laminate 110 (e.g., the textured and coated laminate) include the surface texture 132 and the surface coating 136.

In an example construction, an input end of the coating zone 260 is spaced away from an output end of the texturing zone 254 so that the laminate 110 (e.g., the consolidated and textured laminate) cools before application of the coating 264. In an example implementation, and as illustrated, the textured laminate 130 enters the cooling zone 238, for example, located between the texturing zone 254 and the coating zone 260, where the temperature of the textured laminate 130 is reduced before the coating operation.

Figure 11:
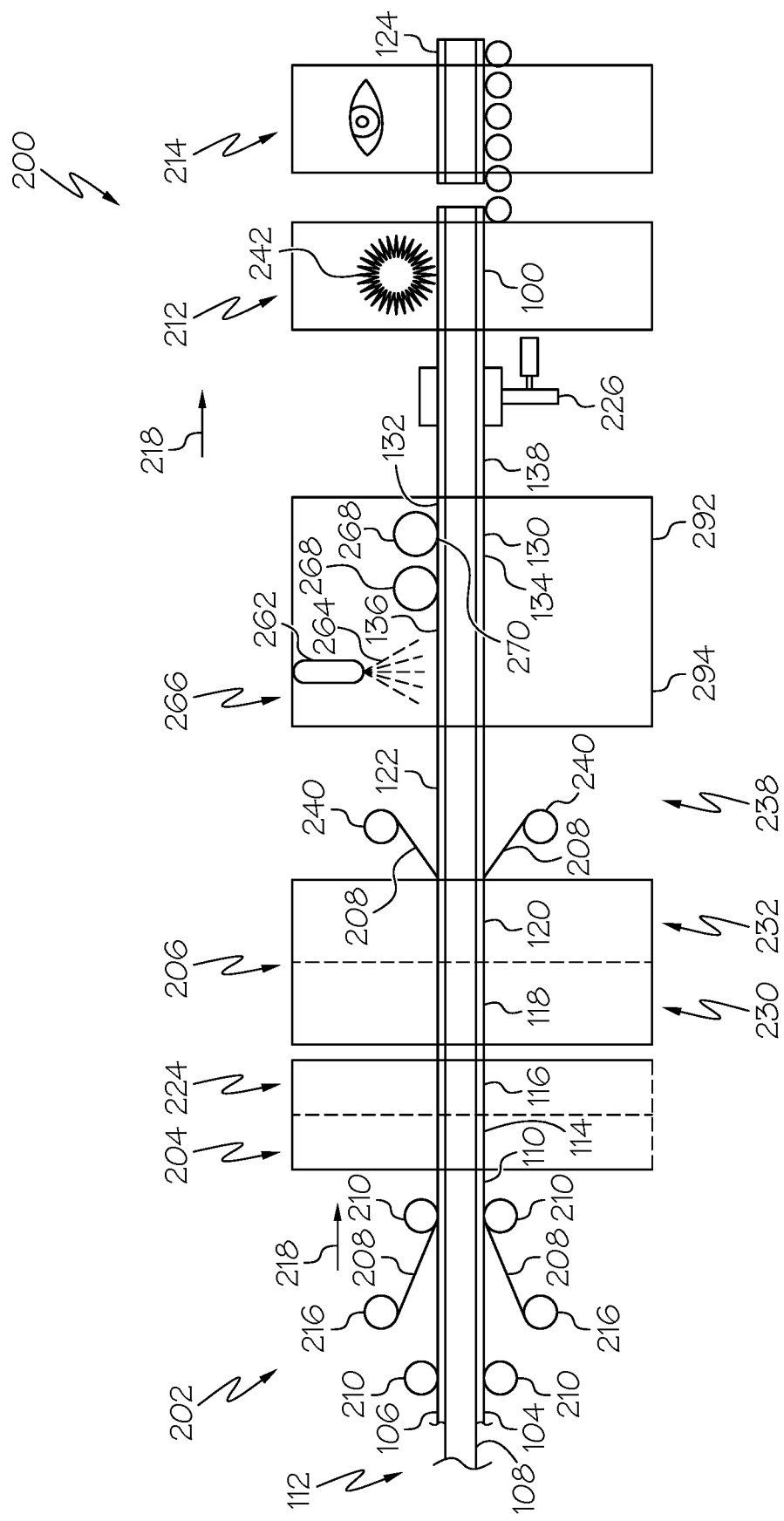
FIG. 11 is a schematic illustration of another embodiment of the disclosed apparatus for continuously fabricating the composite sandwich structure.

FIG. 11 is a schematic illustration of another embodiment of the disclosed apparatus 200 used to form the composite sandwich structure 100. In this embodiment, the apparatus 200 also includes a coating-texturing zone 266. In an example implementation, the pulsating drive mechanism 226 incrementally moves the laminate 110 (e.g., the consolidated and cooled laminate) substantially continuously, in a step-wise manner, through the coating-texturing zone 266. In an example construction of the apparatus 200, the coating-texturing zone 266 includes the coating device 294 that includes one or more applicators 262. The applicator 262 is configured to impart the surface coating 136 onto at least one surface of the laminate 110 (e.g., the consolidated and cooled laminate). In an example, the applicator 262 is a sprayer configured to apply a liquid coating 264 (e.g., a gelcoat) to the surface of the laminate 110. In other examples, the applicator 262 may include other types of mechanisms for applying the coating 264 such as brushes, rollers and the like. The coating-texturing zone 266 also includes the texturing device 292 that includes one or more (e.g., a series) of textured rollers 268 having a textured surface 270 configured to impart the surface texture 132. In an example implementation, the textured rollers 268 are placed into contact with the coated surface of the laminate 110 so that the textured surface 270 of the textured roller 268 forms or otherwise imparts the surface texture 132 into the coating 264 (e.g., the surface coating 136) as it cures, for example, by a thermal or UV curing process.

While the illustrated embodiment shows the applicator 262 applying the coating 264 and the textured rollers 268 texturizing the coating 264 on only one surface of the laminate 110, additional applicators 262 and textured rollers 268 may be used to apply and texturize the coating 264 to both surfaces of the laminate 110 so that both surfaces of the laminate 110 (e.g., the coated-textured laminate 138) include the surface coating 136 and the surface texture 132.

Figure 12:
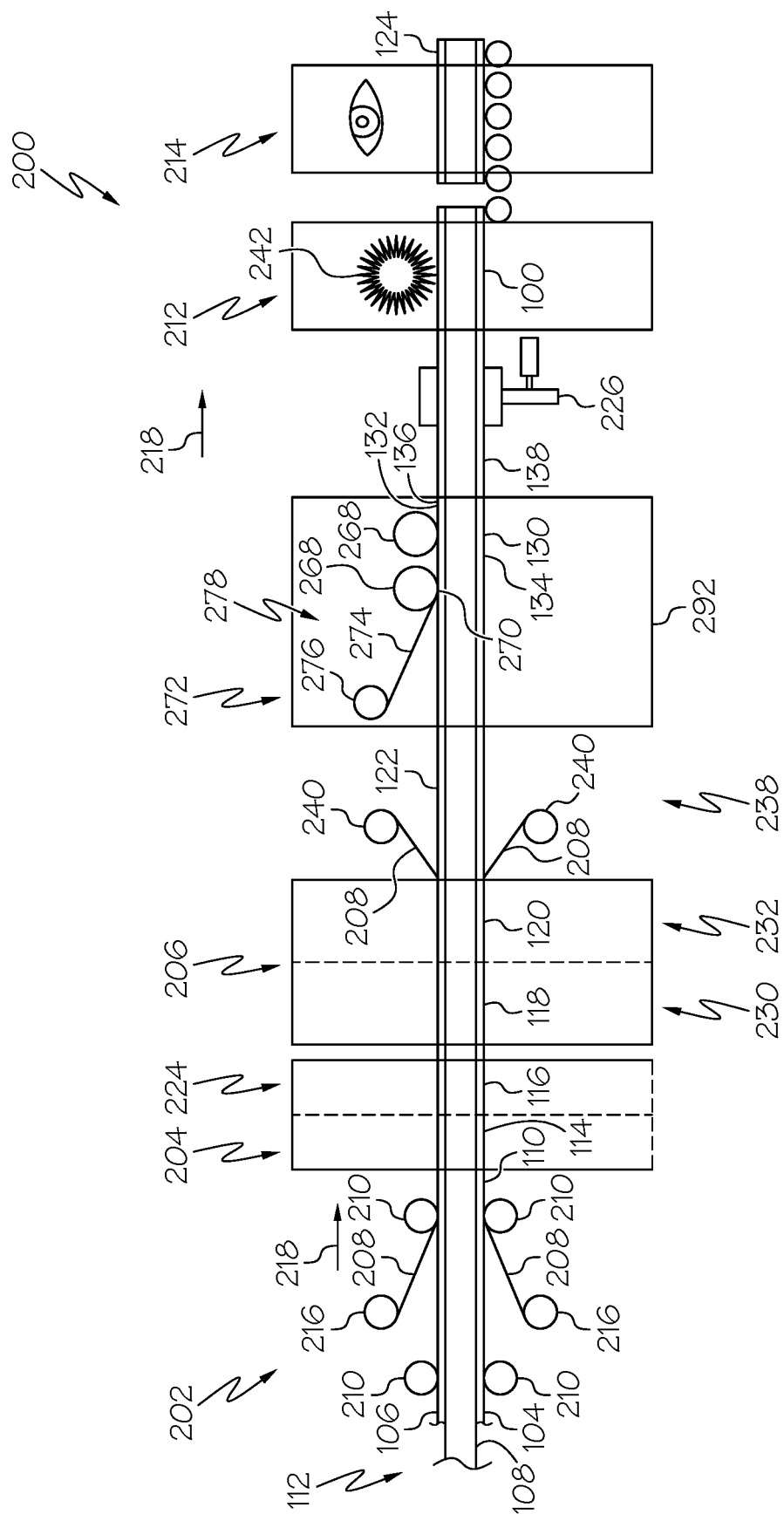
FIG. 12 is a schematic illustration of another embodiment of the disclosed apparatus for continuously fabricating the composite sandwich structure.

FIG. 12 is a schematic illustration of another embodiment of the disclosed apparatus 200 used to form the composite sandwich structure 100. In this embodiment, the apparatus 200 also includes a texturing-coating zone 272. In an example implementation, the pulsating drive mechanism 226 incrementally moves the laminate 110 (e.g., the consolidated and cooled laminate) substantially continuously, in a step-wise manner, through the texturing-coating zone 272. In an example construction of the apparatus 200, the texturing-coating zone 272 includes the texturing device 292 that includes a film applicator 278 configured to apply a thin film 274 to at least one surface of the laminate 110 (e.g., the consolidated and cooled laminate). As an example, the film 274 is supplied in continuous form, for example, from a supply reel 276. The texturing-coating zone 272 also includes one or more (e.g., a series) of textured rollers 268 having a textured surface 270 configured to impart the surface texture 132 to the thin film 274. In an example implementation, the textured rollers 268 are placed into contact with the thin film 274 applied to the surface of the laminate 110 so that the textured surface 270 of the textured roller 268 forms or otherwise imparts the surface texture 132 into the film 274. In this example, the textured rollers 268 may be heated to a temperature sufficient to heat apply the thin film 274. The film 274 may also include at least one of a color (e.g., at least one color or a plurality of colors) and/or a finish (e.g., a glossy finish, a matte finish, a metallic finish, a protective finish, etc.) so that the film 274 also imparts the surface coating 136 to the laminate 110 (e.g., the textured and coated laminate).

While the illustrated embodiment shows the film applicator 278 applying the film 274 and the textured rollers 268 texturizing the film 274 on only one surface of the laminate 110, additional film applicators 278 and textured rollers 268 may be used to apply and texturize the film 274 to both surfaces of the laminate 110 so that both surfaces of the laminate 110 (e.g., the coated-textured laminate 138) include the surface texture 132, and, optionally, the surface coating 136 (e.g., coloring).

Figure 13:
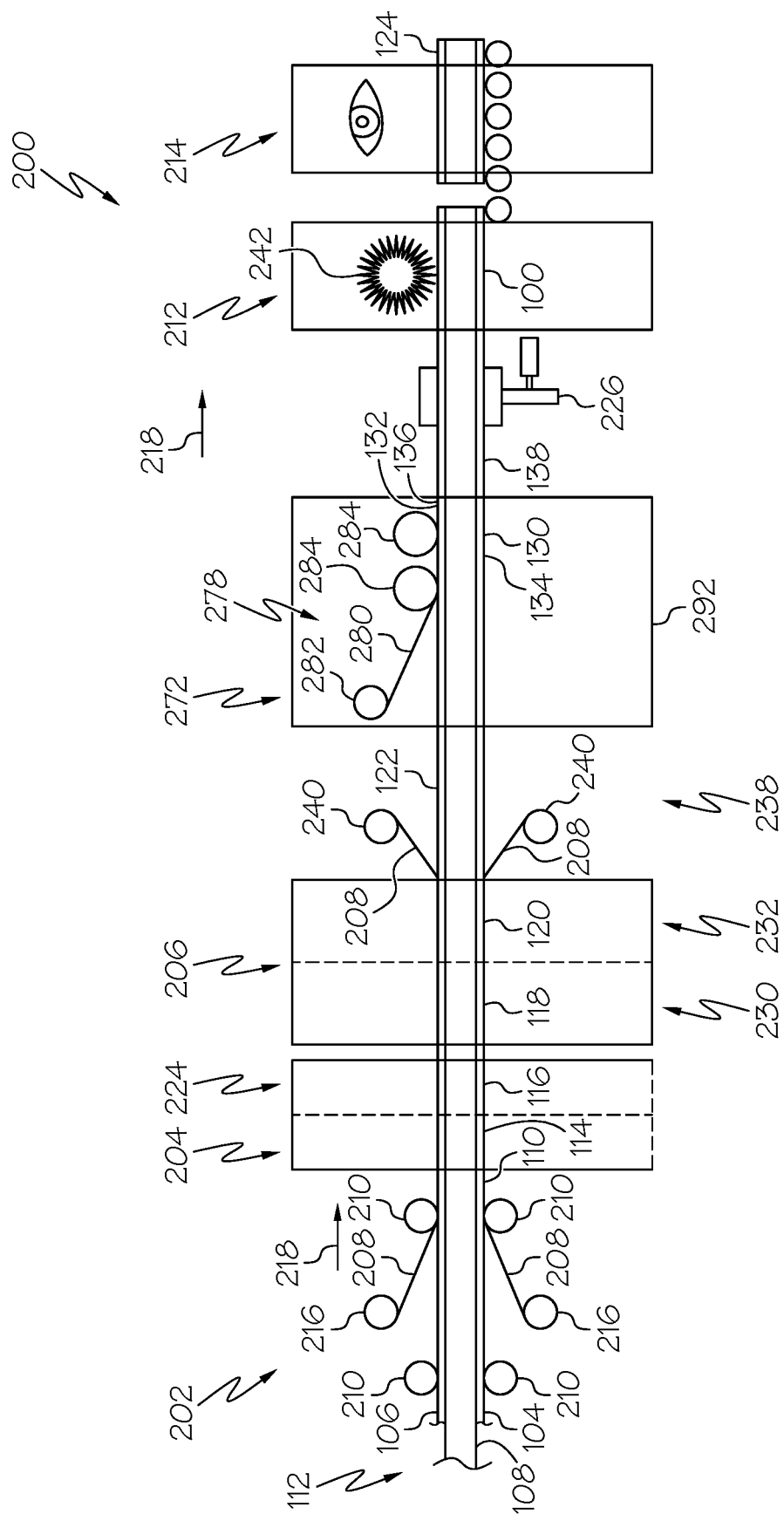
FIG. 13 is a schematic illustration of another embodiment of the disclosed apparatus for continuously fabricating the composite sandwich structure.

FIG. 13 is a schematic illustration of another embodiment of the disclosed apparatus 200 used to form the composite sandwich structure 100. In this embodiment, the apparatus 200 also includes the texturing-coating zone 272. In an example implementation, the pulsating drive mechanism 226 incrementally moves the laminate 110 (e.g., the consolidated and cooled laminate) substantially continuously, in a step-wise manner, through the texturing-coating zone 272. In an example construction of the apparatus 200, the texturing-coating zone 272 includes the texturing device 292 that includes the film applicator 278 configured to apply a textured film 280 to at least one surface of the laminate 110 (e.g., the consolidated and cooled laminate). As an example, the textured film 280 includes a thin film with a textured foil or other texture preformed into the thin film. As an example, the textured film 280 is supplied in continuous form, for example, from a supply reel 282. The texturing-coating zone 272 also includes one or more (e.g., a series) of consolidation rollers 284 configured to consolidate the textured film 280 and the laminate 110. In an example implementation, the consolidation rollers 284 are placed into contact with the textured film 280 applied to the surface of the laminate 110 to impart the surface texture 132 into the surface of the laminate 110. In this example, the consolidation rollers 284 may be heated to a temperature sufficient to heat apply the textured film 280. The textured film 280 may also include at least one of a color (e.g., at least one color or a plurality of colors) and/or a finish (e.g., a glossy finish, a matte finish, a metallic finish, a protective finish etc.) so that the textured film 280 also imparts the surface coating 136 (e.g., the surface color) to the laminate 110 (e.g., the textured and coated or colored laminate).

While the illustrated embodiment shows the film applicator 278 applying the textured film 280 and the consolidation rollers 284 consolidating the textured film 280 on only one surface of the laminate 110, additional film applicators 278 and consolidation rollers 284 may be used to apply and consolidate the textured film 280 to both surfaces of the laminate 110 so that both surfaces of the laminate 110 (e.g., the coated-textured laminate 138) include the surface texture 132, and, optionally, the surface coating 136 (e.g., coloring).

Figure 14:
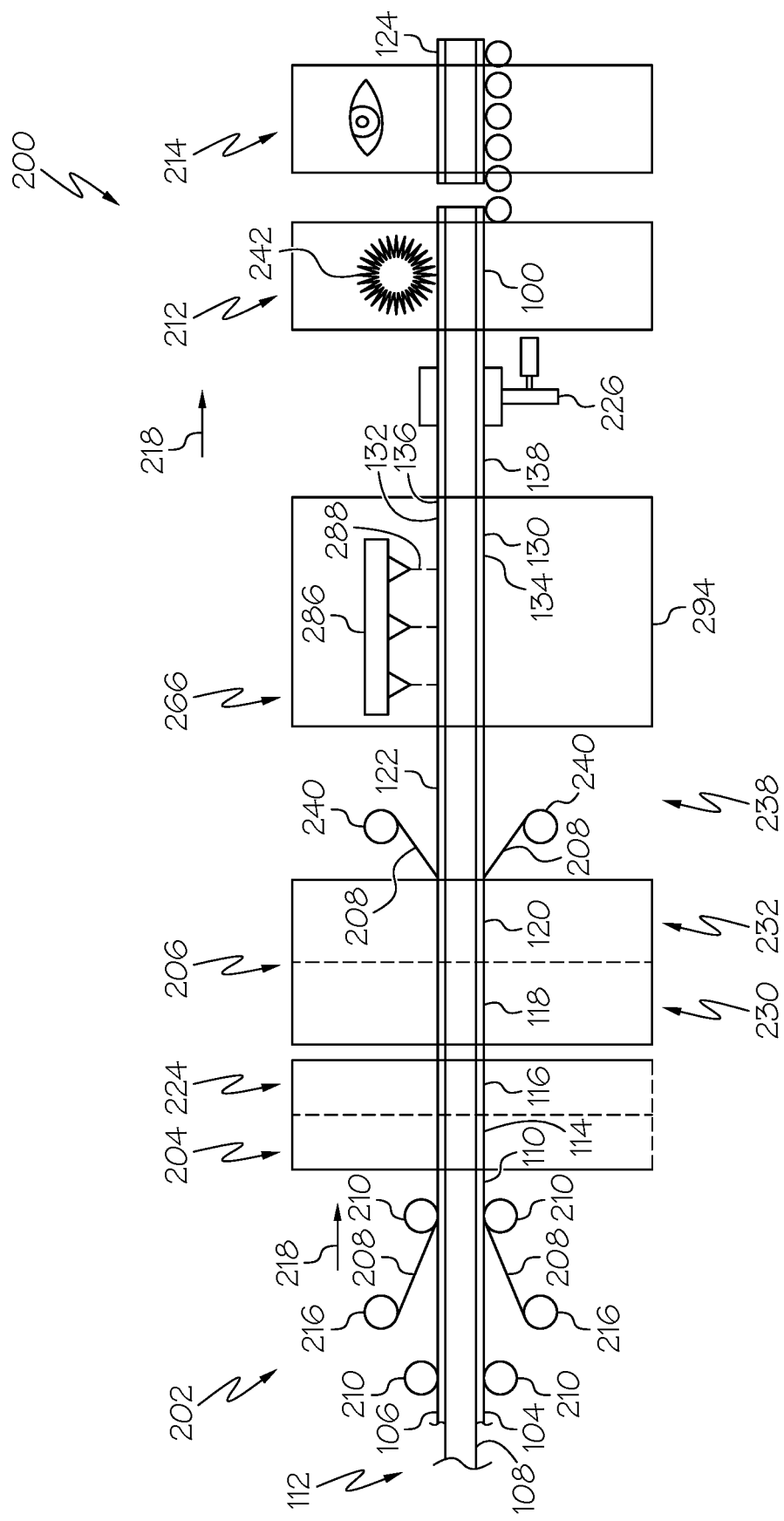
FIG. 14 is a schematic illustration of another embodiment of the disclosed apparatus for continuously fabricating the composite sandwich structure.

FIG. 14 is a schematic illustration of another embodiment of the disclosed apparatus 200 used to form the composite sandwich structure 100. In this embodiment, the apparatus 200 also includes the coating-texturing zone 266. In an example implementation, the pulsating drive mechanism 226 incrementally moves the laminate 110 (e.g., the consolidated and cooled laminate) substantially continuously, in a step-wise manner, through the coating-texturing zone 266. In an example construction of the apparatus 200, the coating-texturing zone 266 includes the coating device 294 that includes one or more printers 286. The printer 286 is configured to apply a printable material 288 and impart the surface coating 136 (e.g., coloring), and, optionally, the surface texture 132, onto at least one surface of the laminate 110 (e.g., the consolidated and cooled laminate). In an example, the printer 286 is an ink jet printer configured to apply ink to the surface of the laminate 110 to form the surface coating 136 (e.g., coloring). In another example, the printer 286 is a 3D printer configured to apply successive layers of material (e.g., an extruded thermoplastic material) to the surface of the laminate 110 to form the surface texture 132 and/or the surface coating 136 (e.g., coloring).

While the illustrated embodiment shows the printer 286 applying the printable material 288 on only one surface of the laminate 110, additional printers 286 may be used to apply, and, optionally, texturize, the printable material 288 to both surfaces of the laminate 110 so that both surfaces of the laminate 110 (e.g., the coated-textured laminate 138) include the surface coating 136, and, optionally, the surface texture 132.

Figure 15:
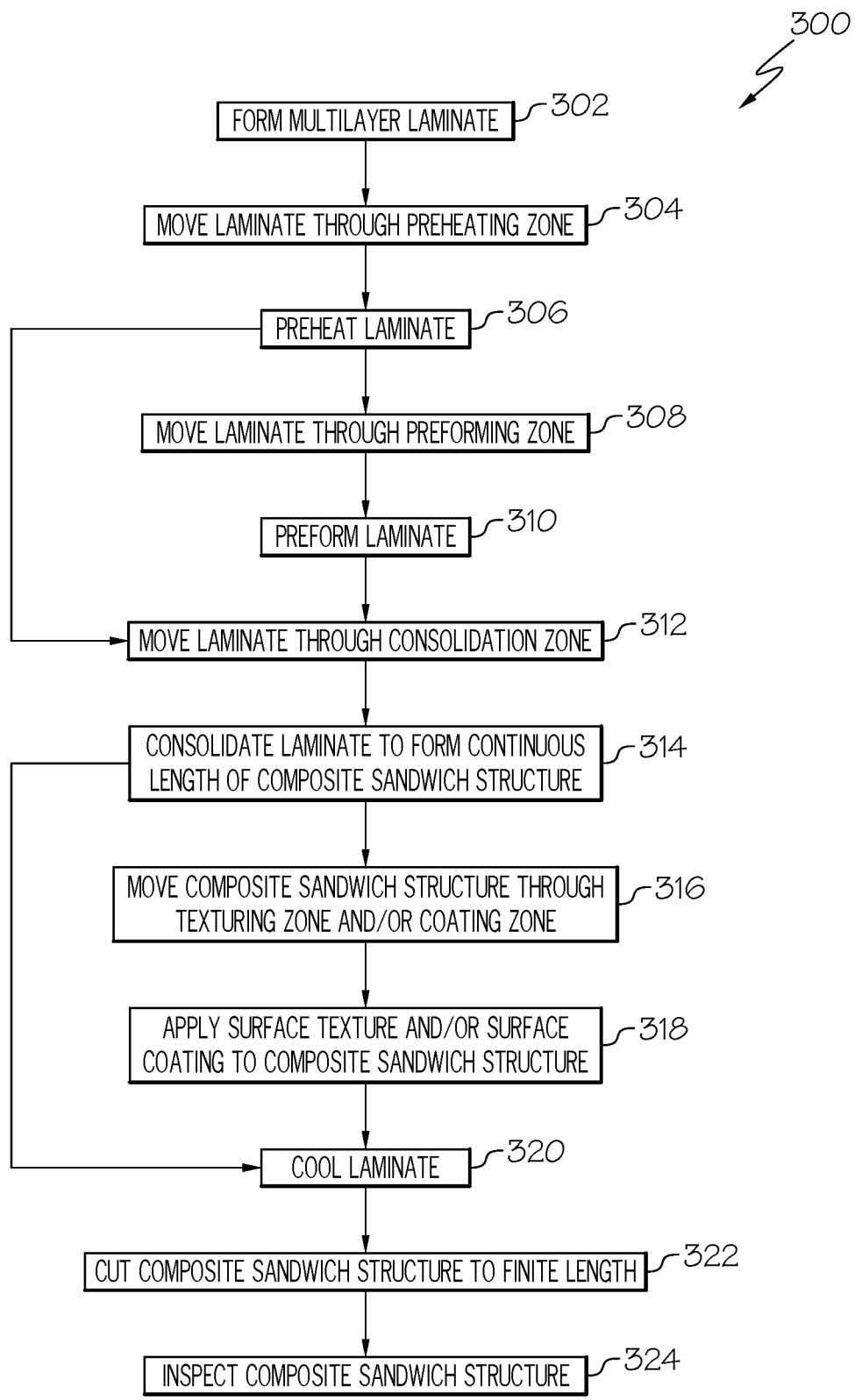
FIG. 15 is a flow diagram of an embodiment of the disclosed method for continuously fabricating the composite sandwich structure.

FIG. 15 is a flow diagram of an example embodiment of the disclosed method 300 for continuously fabricating the composite sandwich structure 100. Beginning at block 302, a stacked laminate 110 of material layers 112 (e.g., the first face sheet 104, the second face sheet 106 and the core 108 sandwiched between the first face sheet 104 and the second face sheet 106) is formed. As an example, the laminate 110 may be pre-constructed as a stacked and tacked laminate introduced to the material supply zone 202. As another example, the laminate 110 may be a layup formed by aligning the material layers 112 at the material supply zone 202.

As shown at block 304, the laminate 110 is substantially continuously moved through the preheating zone 204 where, at block 306, the laminate 110 is preheated to the preforming temperature 152 above the glass transition temperature of the laminate 110 and below or equal to the crystalline melt temperature of the laminate 110 as the laminate 110 is being moved through the preheating zone 204. Preheating (block 306) the laminate 110 may be performed using the preheating device 220, as described above.

Optionally, as shown at block 308, the laminate 110 (e.g., the preheated laminate 114) is substantially continuously moved through the preforming zone 224 where, at block 310, the laminate 110 is incrementally preformed at the preforming temperature 152 into the partially desired shape as the laminate 110 is being moved through the preforming zone 224. Preforming (block 310) the laminate 110 may be performed by the preforming tool dies 228, as described above.

As shown at block 312, the laminate 110 (e.g., the preheated laminate 114 or the preformed laminate 116) is substantially continuously moved through the consolidation zone 206 where, at block 314, the laminate 110 is consolidated as the laminate 110 is being moved through the consolidation zone 206 to form the continuous length of the composite sandwich structure 100. As described above, consolidating (block 314) the laminate 110 includes heating the laminate 110 to a thermoforming temperature 154 above the crystalline melt temperature of the laminate 100 (e.g., sufficient to allow the free flow of the polymeric component of the laminate 110) as the laminate 110 is being moved through the heating zone 230 of the consolidation zone 206 and incrementally forming the laminate 110 at the thermoforming temperature 154 into the desired shape (e.g., having the curvature 126 and/or surface feature 129) as the laminate is being moved through the forming zone 232 of the consolidation zone 206. Consolidating (block 314) the laminate 110 may be performed using the continuous compression molding device 290 (e.g., the heater 234 and the forming tool dies 236), as described above.

Optionally, as shown at block 316, the composite sandwich structure 100 is substantially continuously moved through at least one of the texturing zone 254 and/or the coating zone 260 where, at block 318, at least one of the surface texture 132 and/or the surface coating 136 is applied to at least one surface of the composite sandwich structure 100. Applying (block 318) at least one of the surface texture 132 and/or the surface coating 136 may be performed by a respective one of the texturing device 292 and/or the coating device 294, as described above.

As shown at block 320, the laminate 110 (e.g., the consolidated laminate 120) is cooled. As shown at block 322, the continuous length of the composite sandwich structure 100 is cut into finite lengths of the composite sandwich structure 100. As shown at block 324, the finite lengths of the composite sandwich structure 100 are inspected.

In an example implementation, moving (block 302) the laminate 110, substantially continuously, through the preheating zone 204 and moving (block 312) the laminate 110, substantially continuously, through the consolidation zone 206 is performed along a linear path. Similarly, moving (block 308) the laminate 110, substantially continuously, through the preforming zone 224 is performed along a linear path. Further, moving (block 316) the composite sandwich structure 100 through at least one of the texturing zone 254 and/or the coating zone 260 is performed along a linear path.

The various zones (e.g., the material supply zone 202, the preheating zone 204, the preforming zone 224, the consolidation zone 206, the cooling zone 238, the texturing zone 254, coating zone 260 and the cutting zone 212), and the devices associated with each respective zone, of the disclosed apparatus 200 are arranged in a continuous linked sequence, for example, side-by-side and in line with one another. Similarly, the operations of the fabrication process of the disclosed composite sandwich structure 100 (e.g., method 300) may be performed in incremental progressive steps in a continuous linked sequence. In an example implementation, preheating (block 306) the laminate 110 is performed in incremental progressive steps (e.g., in a stepwise manner progressing in incremental or sequentially adjacent steps a section at a time) as the laminate 110 is moved substantially continuously through the preheating zone 204 and consolidating (block 314) the laminate 110 is performed in incremental progressive steps (e.g., in a stepwise manner progressing in incremental or sequentially adjacent steps a section at a time) as the laminate 110 is moved substantially continuously through the consolidation zone 206 204. Similarly, preforming (block 310) the laminate is performed in incremental progressive steps (e.g., in a stepwise manner progressing in incremental or sequentially adjacent steps a section at a time) as the laminate 110 is moved substantially continuously through the preforming zone 224. Further, applying (block 318) at least one of the surface texture 132 and/or the surface coating 136 is performed in incremental progressive steps (e.g., in a stepwise manner progressing in incremental or sequentially adjacent steps a section at a time) as the laminate 110 is moved substantially continuously through the texturing zone 254 and/or the coating zone 260.

Figure 16:
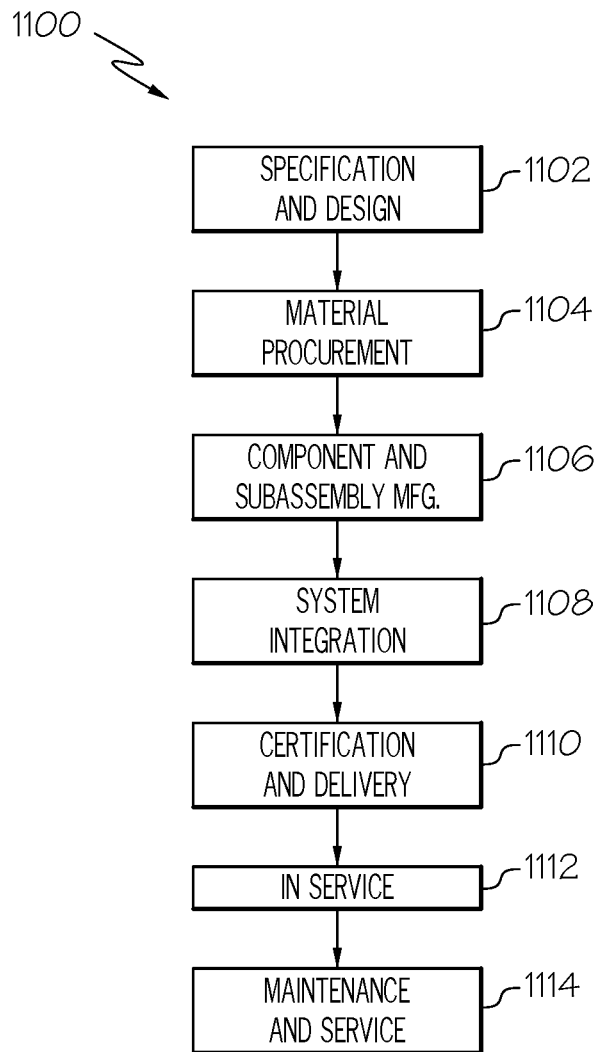
FIG. 16 is a schematic block diagram of aircraft production and service methodology.
Figure 17:
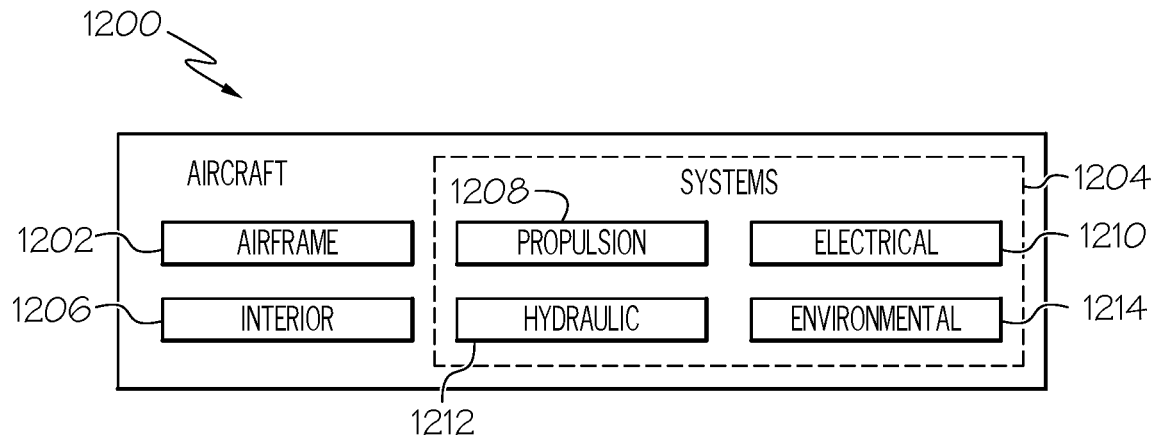
FIG. 17 is a schematic illustration of an aircraft.

Embodiments of the continuously formed composite sandwich structure 100 and apparatus 200 and method 300 for continuously fabricating the composite sandwich structure 100 disclosed herein may find use in a variety of potential applications, particularly in the transportation industry, including for example, aerospace, marine and automotive applications. Thus, referring now to FIGS. 16 and 17, embodiments of the continuously formed composite sandwich structure 100 and apparatus 200 and method 300 for continuously fabricating the composite sandwich structure 100 may be used in the context of an aircraft manufacturing and service method 1100, as shown in FIG. 16, and an aircraft 1200, as shown in FIG. 17. Aircraft applications of the disclosed embodiments may include interior panels, for example, and without limitation, sandwich panels used for flooring, ceilings, sidewalls, lavatories, stow bins, cargo hold liners and other interior aircraft structures.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Production of the continuously formed composite sandwich structure 100, as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, the aircraft 1200 produced by the illustrative method 1100 may include an airframe 1202, for example, having composite sandwich panels or other composite sandwich structures 100 continuously fabricated using the apparatus 200 and method 300, a plurality of high-level systems 1204 and an interior 1206. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while the aircraft 1200 is in service (block 1112) and during maintenance and service stage (block 1114).

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIG. 17, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 17 may be combined in various ways without the need to include other features described in FIG. 17, other drawing figures, and/or the accompanying disclosure, even though such combination or combinations are not explicitly illustrated herein. Similarly, additional features not limited to the examples presented, may be combined with some or all of the features shown and described herein.

In FIGS. 15 and 16, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 15 and 16 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments of the disclosed apparatus, systems and methods have been shown and described, modifications may occur to those skilled in the art upon reading the specification. The present application includes such modifications and is limited only by the scope of the claims.

What is claimed is:

1. A method for continuously fabricating a composite sandwich structure, said method comprising:
   preheating a laminate to a preforming temperature above a glass transition temperature of a polymeric component of said laminate and below or equal to a crystalline melt temperature of said polymeric component of laminate, wherein said laminate comprises a first face sheet, a second face sheet and a honeycomb core sandwiched between said first face sheet and said second face sheet; and
   subsequent to preheating, consolidating said laminate to form a continuous length of said composite sandwich structure, comprising said first face sheet, said second face sheet, and said honeycomb core, sandwiched between said first face sheet and said second face sheet, wherein said consolidating comprises:
      subsequent to preheating, heating said laminate to a thermoforming temperature above said crystalline melt temperature of said polymeric component of said laminate; and
      subsequent to heating, forming said laminate at said thermoforming temperature by applying a forming pressure to said laminate sufficient to fully form said laminate into a desired shape.

2. The method of claim 1 wherein:
   preheating said laminate is performed in incremental progressive steps as said laminate is substantially continuously moved through a preheating zone of a continuous compression molding apparatus;
   heating said laminate is performed incrementally as said laminate is substantially continuously moved through a heating zone of said continuous compression molding apparatus, arranged in said continuous linked sequence with said preheating zone; and
   forming said laminate is performed incrementally as said laminate is substantially continuously moved through a forming zone of said continuous compression molding apparatus, arranged in said continuous linked sequence with said heating zone.

3. The method of claim 2 wherein moving said laminate, substantially continuously, through said preheating zone, said heating zone, and said forming zone is performed along a linear path.

4. The method of claim 1 further comprising, subsequent to forming, cooling said laminate in said desired shape.

5. The method of claim 1 wherein forming said laminate into said desired shape comprises fully forming a transverse curvature, perpendicular to a longitudinal axis of said composite sandwich structure, in said first face sheet, said second face sheet, and said honeycomb core.

6. The method of claim 1 wherein forming said laminate into said desired shape comprises fully forming a surface feature into one of said first face sheet and said honeycomb core or said second face sheet and said honeycomb core.

7. The method of claim 1 wherein forming said laminate into said desired shape is performed using at least one set of forming tool dies to mold said desired shape into said laminate.

8. The method of claim 1 wherein:
   preheating said laminate to said preforming temperature is performed using a preheating device, and
   said preheating device comprises one of an infrared convection oven, a halogen convection oven, an electric convection oven and a gas fired convection oven.

9. The method of claim 1 further comprising:
   subsequent to preheating and prior to heating, preforming said laminate at said preforming temperature by applying a preforming pressure to said laminate sufficient to partially form said laminate into said desired shape.

10. The method of claim 9 wherein preforming said laminate into said desired shape comprises partially forming a transverse curvature, perpendicular to a longitudinal axis of said composite sandwich structure, in said first face sheet, said second face sheet, and said honeycomb core.

11. The method of claim 9 wherein preforming said laminate into said desired shape is performed using at least one set of preforming tool dies to partially mold said desired shape into said laminate.

12. The method of claim 9 wherein:
   preheating said laminate is performed in incremental progressive steps as said laminate is substantially continuously moved through a preheating zone of a continuous compression molding apparatus;
   preforming said laminate is performed in incremental progressive steps as said laminate is substantially continuously moved through a preforming zone of said continuous compression molding apparatus, arranged in a continuous linked sequence with said preheating zone;
   heating said laminate is performed incrementally as said laminate is substantially continuously moved through a heating zone of said continuous compression molding apparatus, arranged in said continuous linked sequence with said preforming zone; and
   forming said laminate is performed incrementally as said laminate is substantially continuously moved through a forming zone of said continuous compression molding apparatus, arranged in said continuous linked sequence with said heating zone.

13. The method of claim 12 wherein moving said laminate, substantially continuously, through said preheating zone, said preforming zone, said heating zone, and said forming zone is performed along a linear path.

14. The method of claim 1 further comprising, prior to preheating, applying a sheet member to an outer surface of said first face sheet and said second face sheet.

15. The method of claim 1 further comprising, subsequent to consolidating, cutting said continuous length of said composite sandwich structure to a predetermined discrete length.

16. A method for continuously fabricating a composite sandwich structure, said method comprising:
 preheating a laminate to a preforming temperature above a glass transition temperature of a polymeric component of said laminate and below or equal to a crystalline melt temperature of said polymeric component of laminate, wherein said laminate comprises a first face sheet, a second face sheet and a honeycomb core sandwiched between said first face sheet and said second face sheet; and
 subsequent to preheating, consolidating said laminate to form a continuous length of said composite sandwich structure, comprising said first face sheet, said second face sheet, and said honeycomb core sandwiched between said first face sheet and said second face sheet; and wherein:
 said first face sheet and said second face sheet comprise a fiber reinforcement impregnated with a polymer matrix;
 said honeycomb core comprises a polymer material;
 preheating said laminate to said preforming temperature softens said honeycomb core; and
 consolidating said laminate comprises heating said first face sheet and said second face sheet to said thermoforming temperature sufficient to allow a free flow of said polymer matrix.

17. The method of claim 16 wherein consolidating said laminate comprises applying a forming pressure to said laminate sufficient to fully form a transverse curvature, perpendicular to a longitudinal axis of said composite sandwich structure, in said first face sheet, said second face sheet, and said honeycomb core.

18. A method for continuously fabricating a composite sandwich structure, said method comprising:
 preheating a laminate to a preforming temperature above a glass transition temperature of a polymeric component of said laminate and below or equal to a crystalline melt temperature of said polymeric component of laminate, wherein said laminate comprises a first face sheet, a second face sheet and a honeycomb core sandwiched between said first face sheet and said second face sheet; and
 subsequent to preheating, consolidating said laminate to form a continuous length of said composite sandwich structure, comprising said first face sheet, said second face sheet, and said honeycomb core sandwiched between said first face sheet and said second face sheet, wherein said consolidating comprises:
 subsequent to preheating, heating said laminate to a thermoforming temperature above said crystalline melt temperature of said polymeric component of said laminate; and
 subsequent to heating, forming said laminate at said thermoforming temperature by applying a forming pressure to said laminate sufficient to fully form said laminate into a desired shape;
 said first face sheet and said second face sheet comprise a fiber reinforcement impregnated with a polymer matrix;
 said honeycomb core comprises a polymer material;
 preheating said laminate to said preforming temperature softens said honeycomb core; and
 heating said laminate comprises heating said first face sheet and said second face sheet to said thermoforming temperature sufficient to allow a free flow of said polymer matrix.

19. The method of claim 18 wherein:
 said polymer matrix of said first face sheet and said second face sheet comprises one of a thermoset resin and a thermoplastic resin, and
 said polymer material of said honeycomb core comprises one of a thermosetting resin and a thermoplastic resin.

* * * * *